United States Patent
Fujimoto et al.

(10) Patent No.: US 7,090,581 B2
(45) Date of Patent: Aug. 15, 2006

(54) POINT MANAGEMENT SYSTEM AND SERVER

(75) Inventors: Jun Fujimoto, Tokyo (JP); Nobuyuki Nonaka, Tokyo (JP)

(73) Assignees: Aruze Corporation, Tokyo (JP); Seta Corporation, Tokyo (JP)

( * ) Notice: Subject to any disclaimer, the term of this patent is extended or adjusted under 35 U.S.C. 154(b) by 512 days.

(21) Appl. No.: 10/132,467

(22) Filed: Apr. 26, 2002

(65) Prior Publication Data

US 2003/0203754 A1    Oct. 30, 2003

(51) Int. Cl.
*A63F 9/24*    (2006.01)

(52) U.S. Cl. .......................................... 463/25; 463/29

(58) Field of Classification Search ............ 463/1, 463/16–20, 25, 28, 29, 42, 43
See application file for complete search history.

(56) References Cited

U.S. PATENT DOCUMENTS

| | | | | |
|---|---|---|---|---|
| 4,866,515 A | * | 9/1989 | Tagawa et al. | 725/77 |
| 5,168,150 A | * | 12/1992 | Plouzennec et al. | 235/475 |
| 5,618,232 A | * | 4/1997 | Martin | 463/25 |
| 5,833,540 A | | 11/1998 | Miodunski et al. | |
| 6,104,815 A | * | 8/2000 | Alcorn et al. | 463/16 |
| 6,113,492 A | * | 9/2000 | Walker et al. | 463/16 |
| 6,154,172 A | * | 11/2000 | Piccionelli et al. | 342/357.1 |
| 6,280,326 B1 | * | 8/2001 | Saunders | 463/25 |
| 6,508,710 B1 | * | 1/2003 | Paravia et al. | 463/42 |
| 2001/0019965 A1 | | 9/2001 | Ochi | |

FOREIGN PATENT DOCUMENTS

| | | |
|---|---|---|
| EP | 1 104 686 | 6/2001 |
| JP | 6-332918 | 12/1994 |
| JP | 9-218900 | 8/1997 |
| JP | 11-3372 | 1/1999 |
| JP | 11-120391 | 4/1999 |
| WO | WO 00/11625 | 3/2000 |
| WO | WO 00/38089 | 6/2000 |

* cited by examiner

*Primary Examiner*—Xuan M. Thai
*Assistant Examiner*—Robert Mosser
(74) *Attorney, Agent, or Firm*—Oblon, Spivak, McClelland, Maier & Neustadt, P.C.

(57) ABSTRACT

A point management system has a game terminal mounted to a vehicle, a server including a point memory for storing user ID and the number of points, which are associated with one another, an authenticator for authenticating user ID inputted via the game terminal using the user ID stored in the point memory, a game controller for allowing the game terminal to execute a game when the authentication succeeds, and a point processor for updating the number of points associated with the user ID stored in the point memory in accordance with a result of game execution.

2 Claims, 20 Drawing Sheets

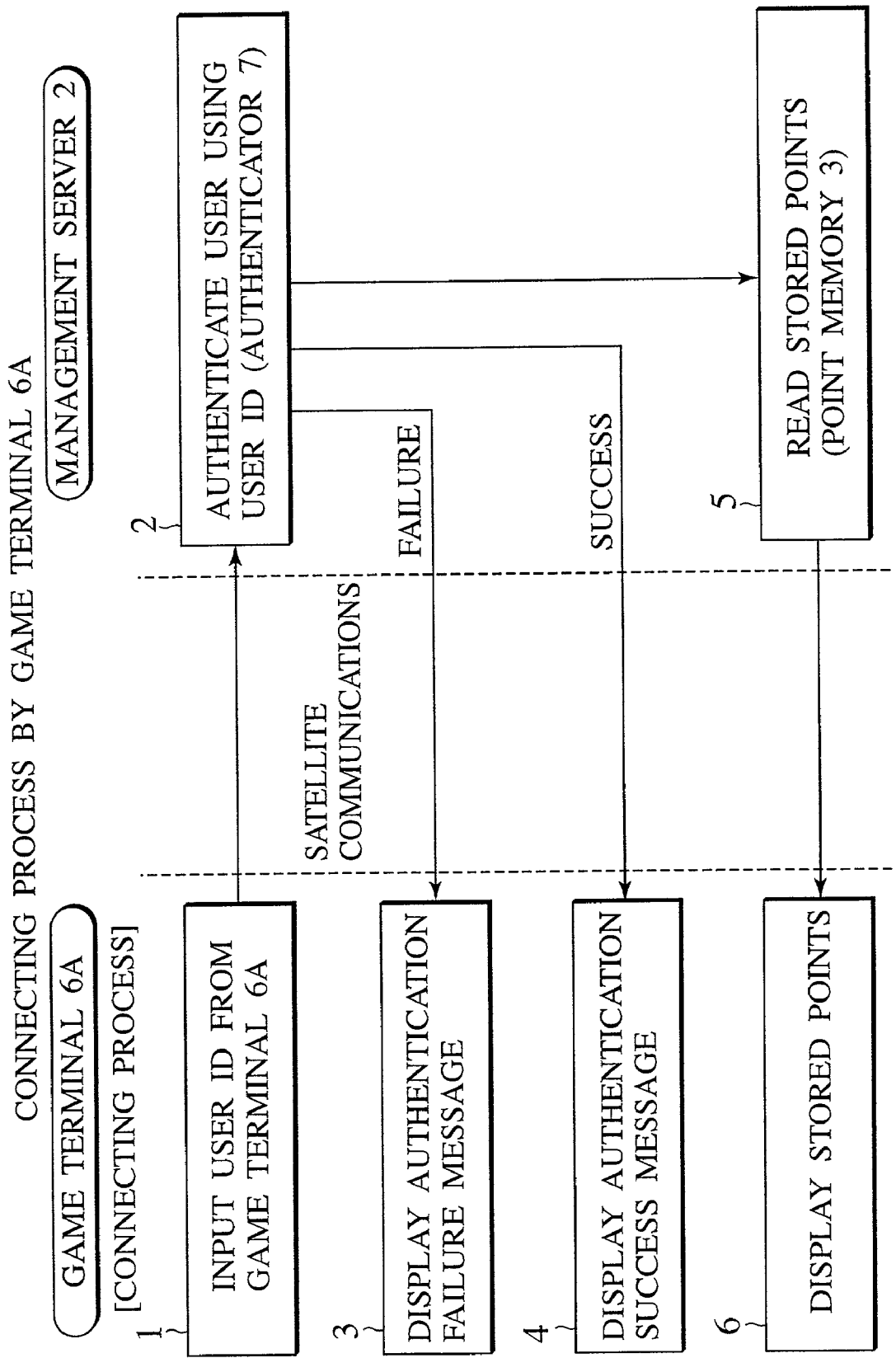

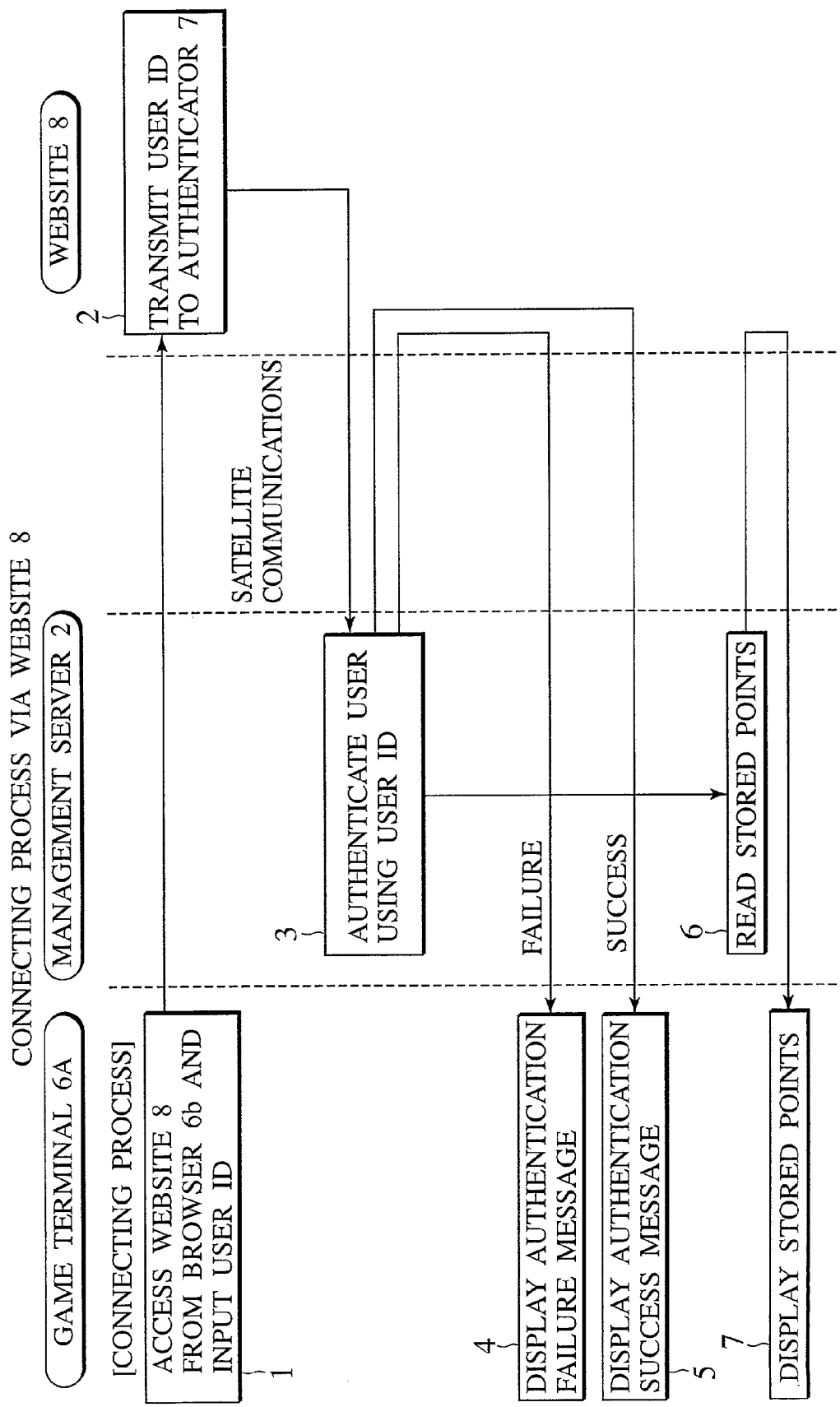

FIG.10A

EXAMPLE OF DATABASE FOR LOT RESULT

| USER ID | NUMBER OF BET POINTS | MULTIPLIER | LOT EXECUTION TIME | RECEPTION TIME | LOT RESULT | NUMBER OF INCREASED/ DECREASED POINTS |
|---|---|---|---|---|---|---|
| ID 001 | 300 | — | IMMEDIATE | 2000.6.02 | LOSE | 0 |
| ID 001 | 200 | 5 | SET TIME 7.10 | 2000.7.04 | WIN | +1000 |
| ID 001 | 100 | 3 | SET TIME 7.30 | 2000.7.25 | LOSE | -600 |
| ID 001 | 500 | 2 | SET TIME 8.10 | 2000.8.04 | WIN | +1000 |
| ID 002 | 100 | 5 | SET TIME 8.10 | 2000.8.03 | WIN | +500 |
| ID 002 | 100 | — | SET TIME 8.10 | 2000.8.03 | LOSE | 0 |
| ID 002 | 200 | 2 | SET TIME 8.10 | 2000.8.04 | WIN | +400 |

FIG.10B

EXAMPLE OF DATABASE FOR GAME RESULT

| USER ID | NUMBER OF BET POINTS | MULTIPLIER RESULTa | MULTIPLIER RESULTb | GAME EXECUTION RESULT | NUMBER OF INCREASED/ DECREASED POINTS |
|---|---|---|---|---|---|
| ID 001 | 500 | 2 | 3 | a LOSE | -1000 |
| ID 002 | 200 | 1 | 2 | b WIN | +400 |
| ID 003 | 100 | 5 | 10 | a LOSE | -500 |
| ID 004 | 200 | 5 | 10 | a WIN | +1000 |

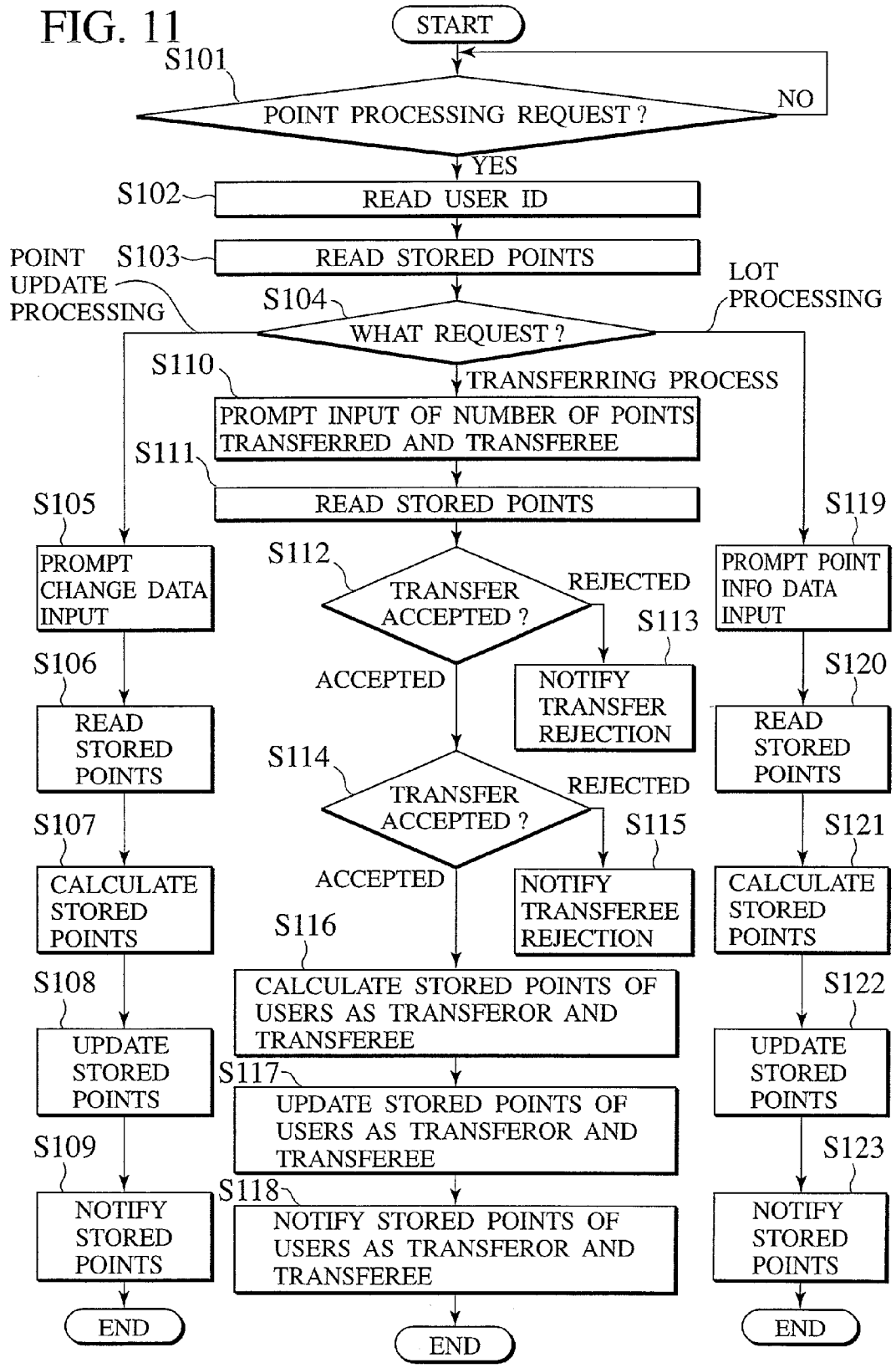

FIG.12

EXAMPLE OF DATABASE FOR POINT PROCESSING

| USER ID | NUMBER OF STORED POINTS | NUMBER OF ACQUIRED POINTS | NUMBER OF TRANSFERRED POINTS | USER AS TRANSFEROR | USER AS TRANSFEREE | NUMBER OF INCREASED/ DECREASED POINTS | PROCESSING DATE |
|---------|---|---|---|---|---|---|---|
| ID 001 | 4300 | | | | | 0 | 2000.6.02 |
| ID 001 | 5300 | | | | | +1000 | 2000.7.10 |
| ID 001 | 4800 | | -500 | | No112 | | 2000.7.12 |
| ID 001 | 4200 | | | | | -600 | 2000.7.30 |
| ID 001 | 5100 | 500 | | | | | 2000.8.03 |
| ID 001 | 6100 | | | | | 1000 | 2000.8.10 |
| ID 001 | 6500 | | 400 | No231 | | | 2000.8.04 |

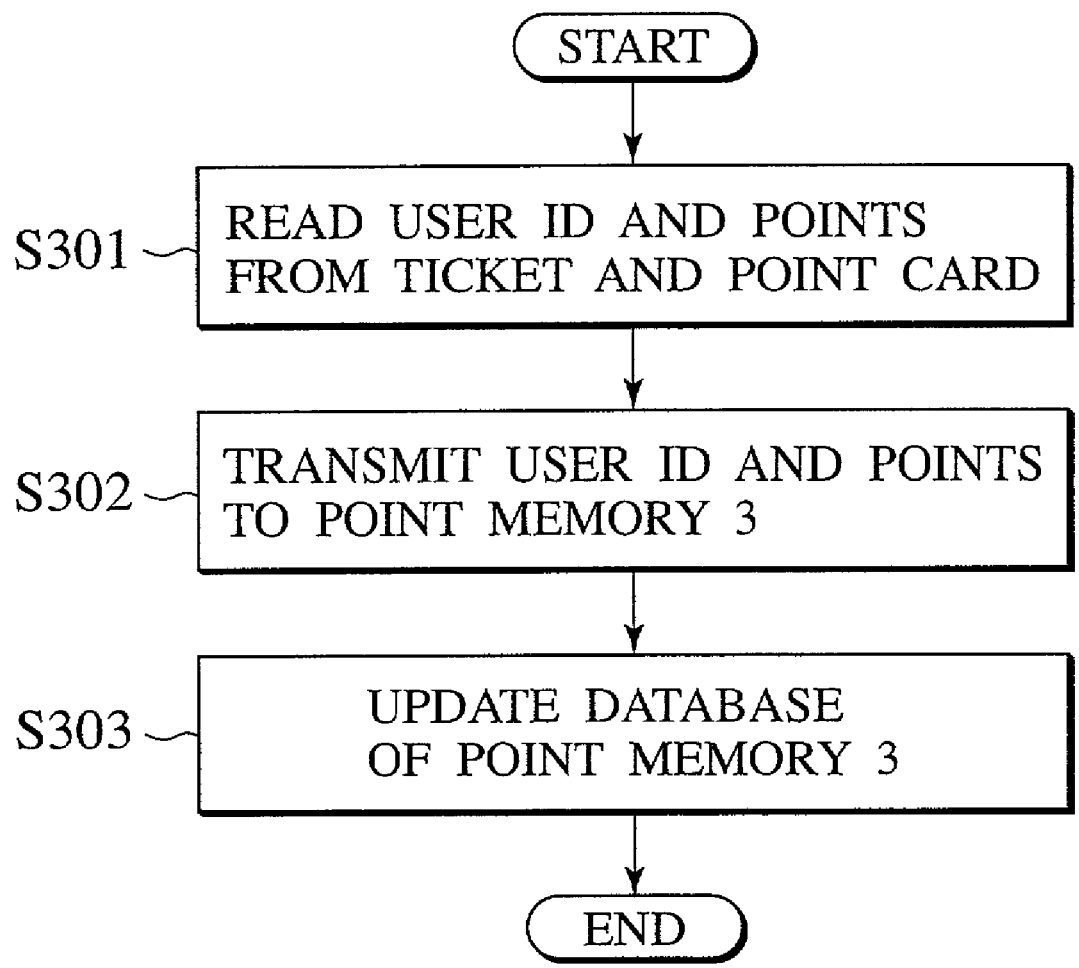

POINT MANAGEMENT SYSTEM AND SERVER

BACKGROUND OF THE INVENTION

1. Field of the Invention

This invention relates to a point management system for managing points issued in association with the sale of goods or the provision of service for each user (customer), and a server suitable for use in the system. More particularly, the present invention relates to a point management system for enabling users to effectively use points in vehicles such as airplanes, ships, trains and automobiles, and a server suitable for use in the system.

2. Description of the Related Art

Conventionally known is a system for providing point service in which a service provider (member) issues points to a user in accordance with the user's purchase of goods or service, and the user receives a given piece of goods or service (gift) in return for the points.

In such a system, a service provider issues points to a user in such a manner as affixing stamps on a point collection board, putting seals on a point collection board or issuing coupon tickets in accordance with the purchase of goods or service by the user. The user collects the issued points until the collected points exceed a certain number, and then exchanges the points for a given piece of goods or service (gift).

The point collection board or coupon tickets are inconvenient for keeping. In some cases, magnetic cards are used instead for recording points.

Such a point service is also applied to aerial service. An airline company stores points in accordance with the distances (miles) of usage of airplanes by users. The users receive gifts based on the stored points.

In such conventional point service of aerial service, a user updates the number of points after utilizing an airplane, and applies for a gift based on the updated number of points in order to receive a gift offered in accordance with the stored points. The user thus cannot receive a gift while on board.

Similarly, in such point service offered in ships, trains and automobiles, users only hold respective points while on board and cannot receive gifts.

Further, in the conventional system, the number of points for receiving a gift or service offered is set. When the number of points collected by a user does not reach a predetermined number of points, the user cannot receive a gift.

In the conventional system, when keeping fractional points with which any gifts cannot be changed, the user must purchase goods or service further to increase the number of points acquired, in order to receive gifts.

Further, in the conventional system, when a user keeps fractional points and the expiration date is set for the collected points, or gifts or service offered are changed periodically, the points tend to become invalid or the user is prevented from receiving a desired gift.

Further, in the conventional system, a user using point service with low frequency is likely to forget the existence of point service and cast away the acquired points. Service providers thus cannot expect the effect of promoting customers to purchase goods or service.

Further, the conventional system provides a limited utilizable range of point service and is incompatible with another system providing other point service. A user must keep a plurality of point service cards, and the availability of acquired points is low.

SUMMARY OF THE INVENTION

It is thus an object of the present invention to provide a point management system which solves the above conventional problems and increases the availability of points by users. It is another object of the present invention to provide a point management system in which users can effectively use acquired points even when traveling with vehicles such as airplanes, ships, trains and automobiles.

According to an aspect of the present invention, there is provided a point management system which comprises: a game terminal mounted to a vehicle; a server comprising a point memory for storing user ID and the number of points, which are associated with one another; an authenticator for authenticating user ID inputted via the game terminal using the user ID stored in the point memory; a game controller for allowing the game terminal to execute a game when the authentication succeeds; and a point processor for updating the number of points associated with the user ID stored in the point memory in accordance with a result of execution of the game.

In the above point management system, it is preferred that the server comprise the authenticator, the game controller, and the point processor; and the server and the game terminal be configured to be able to communicate with one another via satellite communications.

In the above point management system, it is preferred that the game controller be mounted to the vehicle and be configured to be able to communicate with the game terminal; the server comprise the authenticator and the point processor; and the server and the game terminal be configured to be able to communicate with one another via satellite communications.

In the above point management system, it is preferred that the point processor be mounted to the vehicle and be configured to be able to communicate with the game terminal; the server comprise the authenticator and the game controller; the point processor update the number of points recorded on a point record medium in accordance with a result of execution of the game; and the server and the game terminal be configured to be able to connect to one another via satellite communications.

In the above point management system, it is preferred that the point processor and the game controller be mounted to the vehicle, and be configured to be able to communicate with the game terminal; the server comprise the authenticator; the point processor update the number of points recorded on a point record medium in accordance with a result of execution of the game; and the server and the game terminal be configured to be able to connect to one another via satellite communications.

In the above point management system, the point processor preferably increases or decreases the number of points stored in the point memory by the number of points having been inputted via the game terminal, in accordance with a result of execution of the game.

In the above point management system, the game is preferably lot, and a result of the game execution is a result of the lot.

In the above point management system, the point processor preferably updates the number of points stored in the point memory in accordance with the traveling conditions of the vehicle.

According to another aspect of the present invention, there is provided a server configured to be able to communicate with a game terminal mounted to a vehicle via satellite communications, which server comprises: a point memory for storing user ID and the number of points, which are associated with one another; an authenticator for authenticating user ID inputted via the game terminal using the user ID stored in the point memory; a game controller for allowing the game terminal to execute a game when the authentication succeeds; and a point processor for updating the number of points associated with the user ID stored in the point memory in accordance with a result of execution of the game.

In the above server, the point processor preferably increases or decreases the number of points stored in the point memory by the number of points having been inputted via the game terminal, in accordance with a result of execution of the game.

In the above server, the game is preferably lot, and a result of execution of the game is a result of the lot.

In the above server, the point processor preferably updates the number of points stored in the point memory in accordance with the traveling conditions of the vehicle.

These and other features and advantages of the present invention will be more readily apparent from the following detailed description of preferred embodiments and the accompanying drawings.

BRIEF DESCRIPTION OF THE DRAWINGS

FIGS. 4A and 4B are sequence diagrams illustrating connecting process between a game terminal and a management server in the point management system according to the first embodiment of the present invention;

FIGS. 5A and 5B are sequence diagrams illustrating connecting process between the game terminal and the management server in the point management system according to the first embodiment of the present invention;

FIGS. 10A and 10B are diagrams illustrating an example of data contents for use in the point processing by a point processor in the point management system according to the first embodiment of the present invention;

FIG. 11 is a flow chart illustrating the point processing in the point management system according to the first embodiment of the present invention;

FIG. 12 is a diagram illustrating an example of data contents for use in the point processing by the point processor in the point management system according to the first embodiment of the present invention;

FIG. 17 is a flow chart illustrating point processing in the point management system according to the fourth embodiment of the present invention.

DESCRIPTION OF THE PREFERRED EMBODIMENTS

Figure 1A:
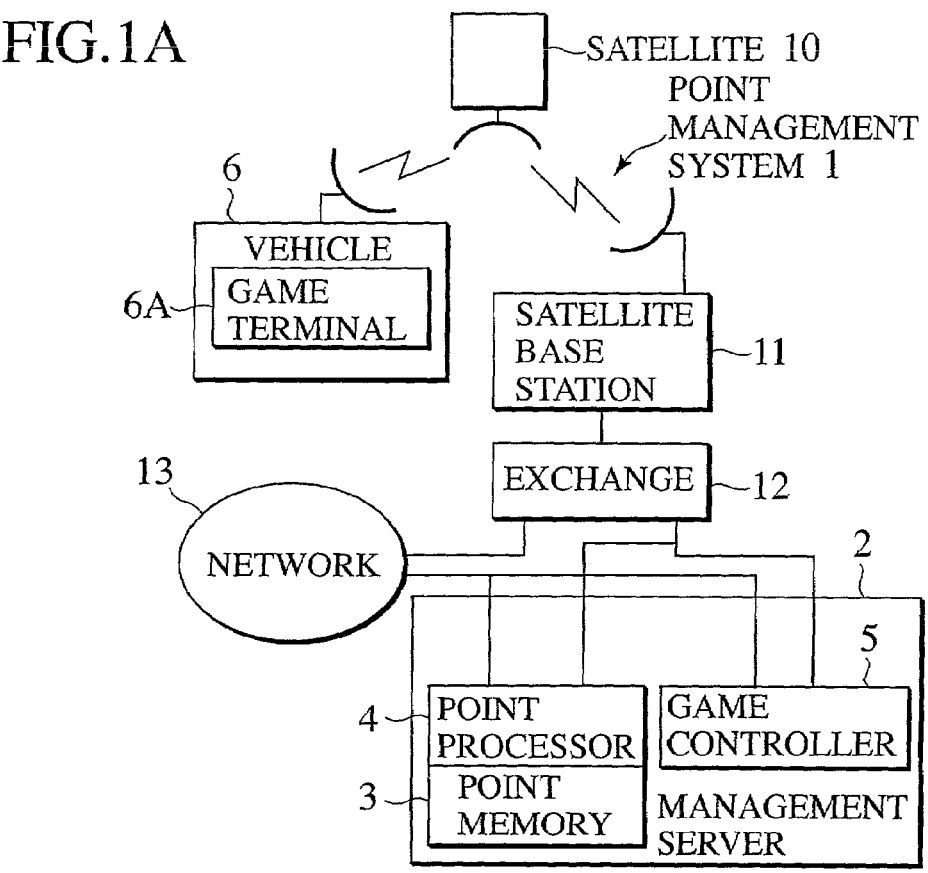
FIGS. 1A to 1D illustrate entire constructions of a point management system according to embodiments of the present invention.
Figure 1B:
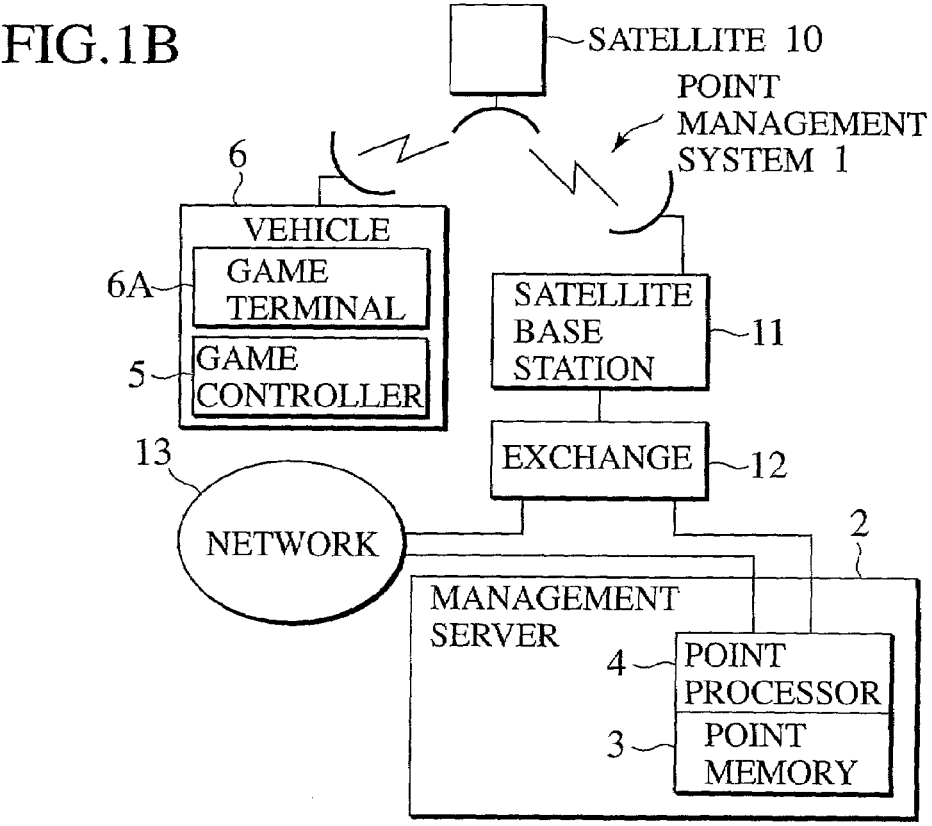
Figure 1C:
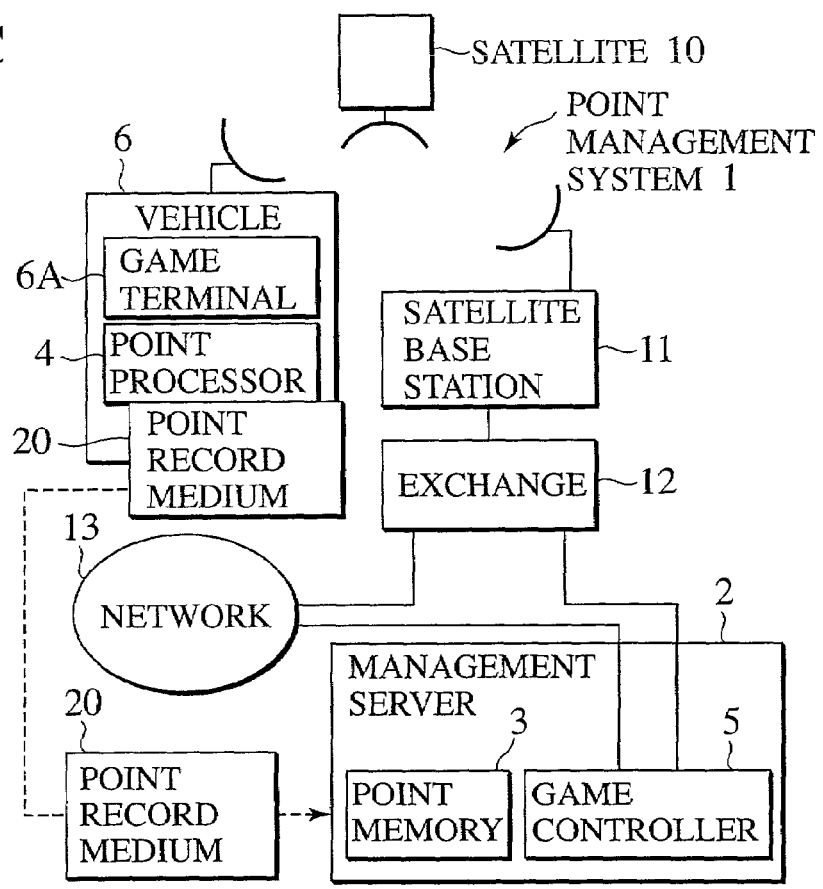
Figure 1D:
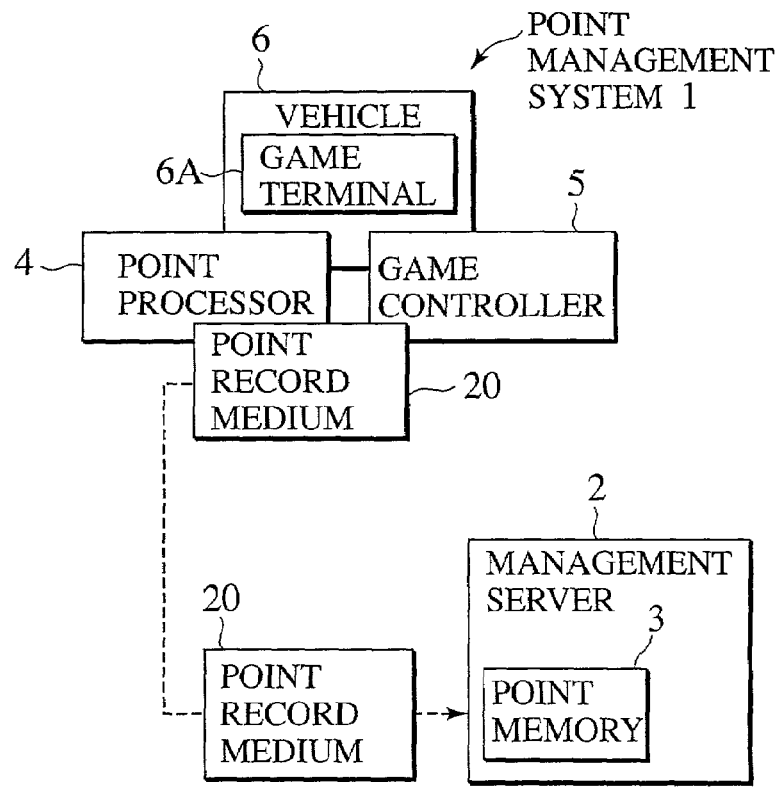

With reference to the accompanying drawings, preferred embodiments of the present invention will be described in detail below. FIG. 1A illustrates an entire construction of a first embodiment of a point management system according to the present invention. FIG. 1B illustrates an entire construction of a second embodiment of the point management system of this invention. FIG. 1C illustrates an entire construction of a third embodiment of the point management system of this invention. FIG. 1D illustrates an entire construction of a fourth embodiment of the point management system of this invention.

Construction of Point Management System in Embodiment 1

A point management system 1 according to this embodiment includes a management server 2 controlling the execution of games at a game terminal 6A mounted to a vehicle 6 and managing point information via satellite communications.

The point management system 1 of this embodiment has, as shown in FIG. 1A, the management server 2, the game terminal 6A mounted to the vehicle 6, a satellite 10, a satellite base station 11, an exchange 12, and a network 13.

In the point management system 1 of this embodiment, the game terminal 6A mounted to the vehicle 6 is configured to be able to communicate with the management server 2 via the satellite 10 and the satellite base station 11, that is, via satellite communications.

In the point management system 1 of this embodiment, the connection between the exchange 12 and the management server 2 are established directly or via the network 13.

In the point management system 1 of this embodiment, the management server 2 performs authentication using user ID stored on a debit card or the like. When the authentication succeeds, the game terminal 6A performs processing for connection to the management server 2 so as to be able to give and receive point information including a point processing request to and from the management server 2 in connection.

Figure 2:
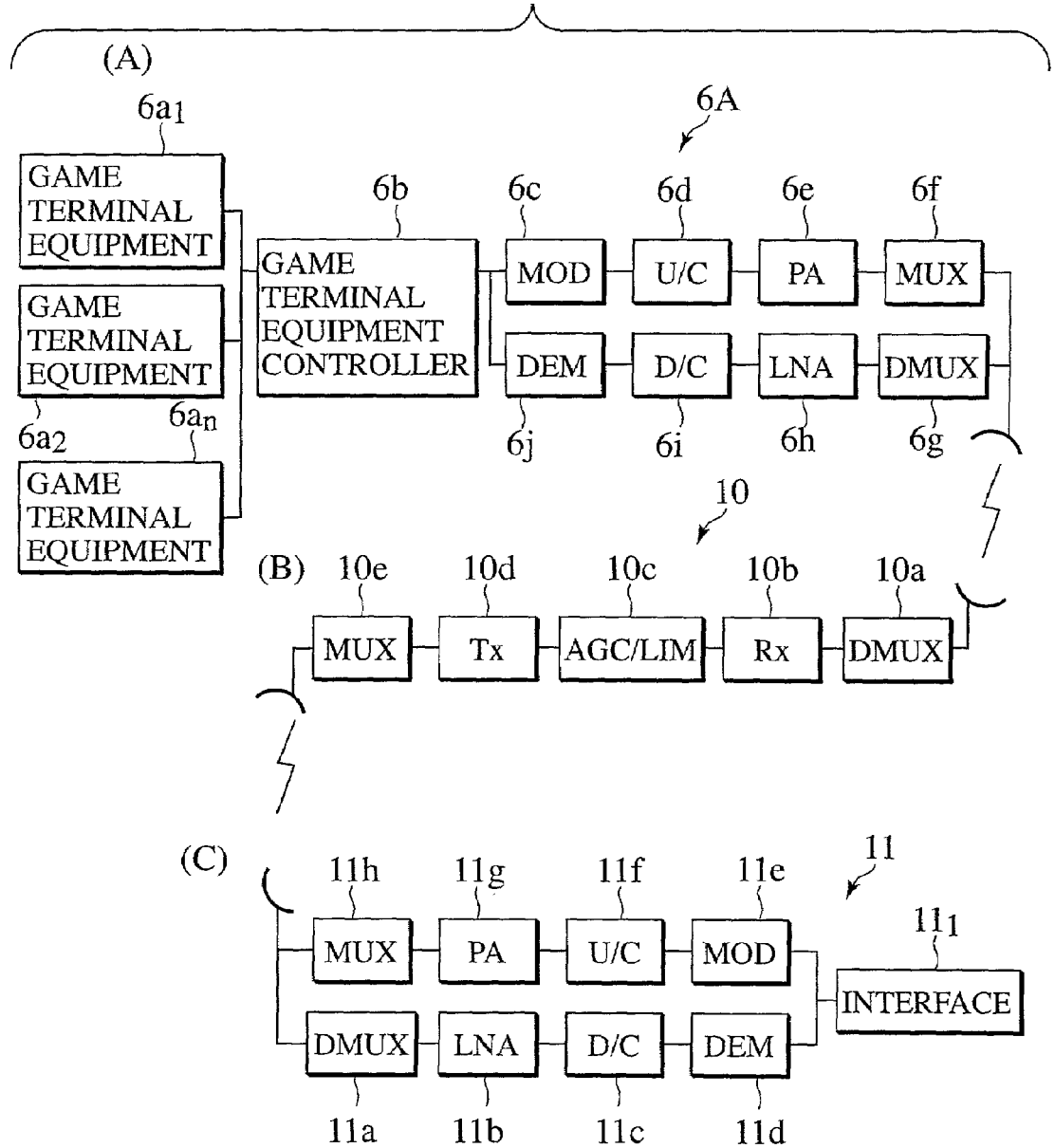
FIGS. 2A to 2C illustrate constructions of a game terminal, a satellite, and a satellite base station, respectively, in the point management system according to the present invention.

FIG. 2A illustrates an exemplary configuration of the game terminal 6A. The game terminal 6A has game terminal equipment 6a1 to 6an with I/O devices such as a display device and manual operation buttons, game terminal equipment controller 6b for controlling the game terminal equipment 6a1 to 6an, and components 6c to 6j for communication with the satellite 10.

The communication components 6c to 6j are divided into a transmitting end and a receiving end. The transmitting end has a modulator (MOD) 6c, an up converter (U/C) 6 for conversion into a transmit frequency, a power amplifier (PA) 6e, and a multiplexor (MUX) 6f for combination with signals of other radio channels. The receiving end has a demultiplexor (DMUX) 6g for separating out signal components relating to a game from received signals, a low noise amplifier (LNA) 6h, a down converter (D/C) 6i for conversion into a receive frequency, and a demodulator (DEM) 6j.

FIG. 2B illustrates an exemplary configuration of the satellite 10. The satellite 10 has a demultiplexor (DMUX) 10a, a receiver 10b, an automatic gain controller and limiting circuit (AGC/LIM) 10c, a transmitter 10d, and a multiplexor (MUX) 10e.

In the present invention, the satellite 10 may be a broadcasting satellite, a digital communication satellite, a GPS satellite, or any other satellite.

FIG. 2C illustrates an exemplary configuration of the satellite base station 11. The satellite base station 11 has components 11a to 11h for communication with the satellite 10 and an interface 11i for connection to the exchange 12.

The communication components 11a to 11h are divided into a transmitting end and a receiving end. The receiving end has a demultiplexor (DMUX) 11a for separating out signal components relating to a game from received signals, a low noise amplifier (LNA) 11b, a down converter (D/C) 11c for conversion into a receive frequency and a demodulator (DEM) 11d. The transmitting end has a modulator (MOD) 11e, an up converter (U/C) 11f for conversion into a transmit frequency, a power amplifier (PA) 11g and a multiplexor (MUX) 11h for combination with signals of other radio channels.

In the present specification, the management server 2 and the game server 6A are configured to be able to communicate with one another via satellite communications. The present invention is not limited thereto. The management server 2 and the game terminal 6A may be configured to be able to communicate with one another via any radio communication such as mobile communication.

Figure 3:
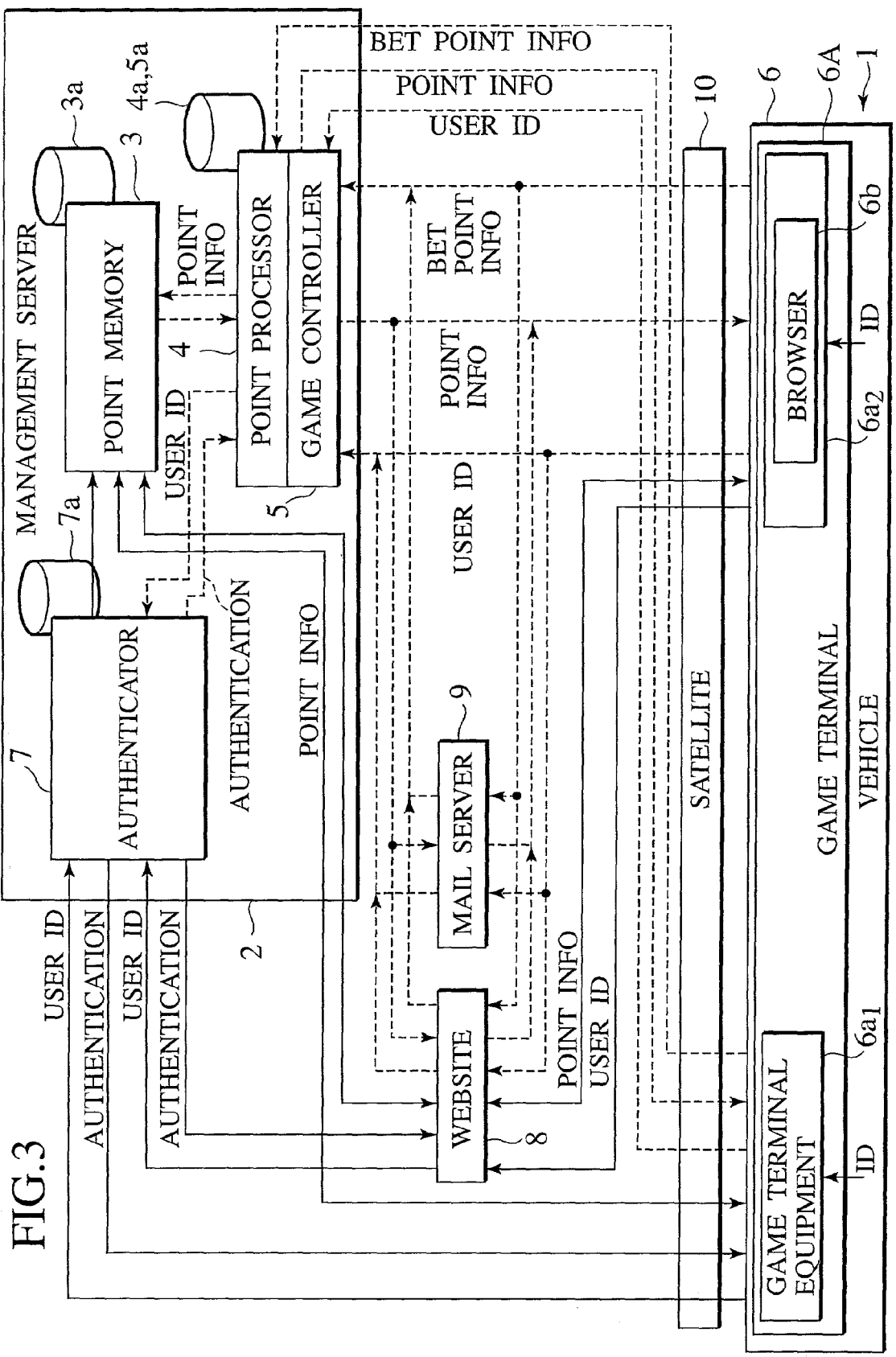
FIG. 3 is a functional block diagram of the point management system according to a first embodiment of the present invention.

FIG. 3 illustrates functional blocks of the point management system 1 in this embodiment.

The management server 2 has, as shown in FIG. 3, a point memory 3 for storing user ID and the number of points, which are associated with one another, an authenticator 7 for authenticating user ID inputted via the game terminal 6A using the user ID stored in the point memory 3, a game controller 5 for allowing the game terminal 6A to execute a game when the authenticator 7 succeeds in authentication, and a point processor 4 for updating the number of points associated with the user ID stored in the point memory 3 according to a result of the game executed.

The point memory 3 may increase and decrease the number of points stored in association with user ID identifying a given user, in accordance with an instruction from the point processor 4. The point memory 3 may also increase and decrease the number of points stored in association with user ID identifying a given user, in accordance with a request from the user authenticated by the authenticator 7. The point memory 3 stores in a database 3a the number of points associated with user ID and point information including historical information on changes in the number of points.

The point processor 4 may instruct the point memory 3 to increase or decrease the number of points stored in association with user ID identifying a given user, in response to a request from the user authenticated by the authenticator 7.

The point processor 4, for example, instructs the point memory 3 on the transfer of points between users in response to a request for the transfer of points between the users.

The point processor 4 may also instruct the point memory 3 to increase or decrease the number of points stored in the point memory 3 by the number of points having been inputted via the game terminal 6A, in accordance with a result of a game executed at the game terminal 6A. The point processor 4 may, for example, instruct the point memory 3 to increase or decrease the number of points stored in the point memory 3 by the number of points having been bet by the user when the result of lot is a "win" at the game terminal 6A.

Through various other methods, the point processor 4 may determine the number of points increased or decreased for an identified user and instruct the point memory 3 to increase or decrease the number of points stored in the point memory 3.

The point processor 4 may also update the number of points stored in the point memory 3 in accordance with the travelling conditions of the vehicle 6. When the vehicle 6 traveled with time delay, for example, the point processor 4 may instruct the point memory 3 to give a predetermined number of points to a user who used the vehicle 6.

The game controller 5 controls the execution of a game at the game terminal 6A.

The authenticator 7 verifies whether a user having transmitted an access request to the management server 2 is a registered authorized user or not. The authenticator 7 allows only an authorized user to access the management server 2. The authenticator 7, for example, allows only an authorized user to transmit a request for the increase or decrease of the number of points stored in the point memory 3 to the point memory 3 or the point processor 4.

As shown in FIG. 3, the network 13 is provided with a website 8 and a mail server 9 in addition to the management server 2. The game terminal 6A establishes connection with the management server 2 via the website 8 or the mail server 9 to request access to the point information or to request change in the number of points.

The game terminal 6A has game terminal equipment 6a1 dedicated to game execution installed in the vehicle 6 or game terminal equipment 6a2 as a portable remote terminal such as a mobile telephone, PDA, or notebook-sized personal computer, with software (such as a browser 6b when the network is the Internet) for communication with the network.

The game terminal 6A mounted to the vehicle 6 establishes connection with the satellite base station 11 and the exchange 12 via the satellite 10, and thereafter establishes connection with the management server 2 directly or via the network, or via the website 8 or the mail server 9 in the network, so as to request access to the point information related to the user, to update the number of points associated with the purchase of goods or service, to change the point information by the point processor 4 and the like. When having established connection with the management server 2 via the mail server 9, the game terminal 6A sends various requests to the management server 2 in the form of E-mail.

In FIG. 3, the point memory 3, point processor 4, game controller 5 and authenticator 7 have databases 3a, 4a, 5a and 7a, respectively. Those units may be configured to have a common database (not shown).

Operation of Point Management System in Embodiment 1

The operation of the point management system 1 according to the present embodiment will be described with reference to FIGS. 4 to 12. Referring to FIGS. 4 and 5, connecting process between the game terminal 6A and the management server 2 in the point management system 1 of this embodiment is described below. Referring to FIGS. 6 to 12, point processing in the point management system 1 of this embodiment will be described. The description will be made below using the reference numerals in those figures.

Figure 4B:
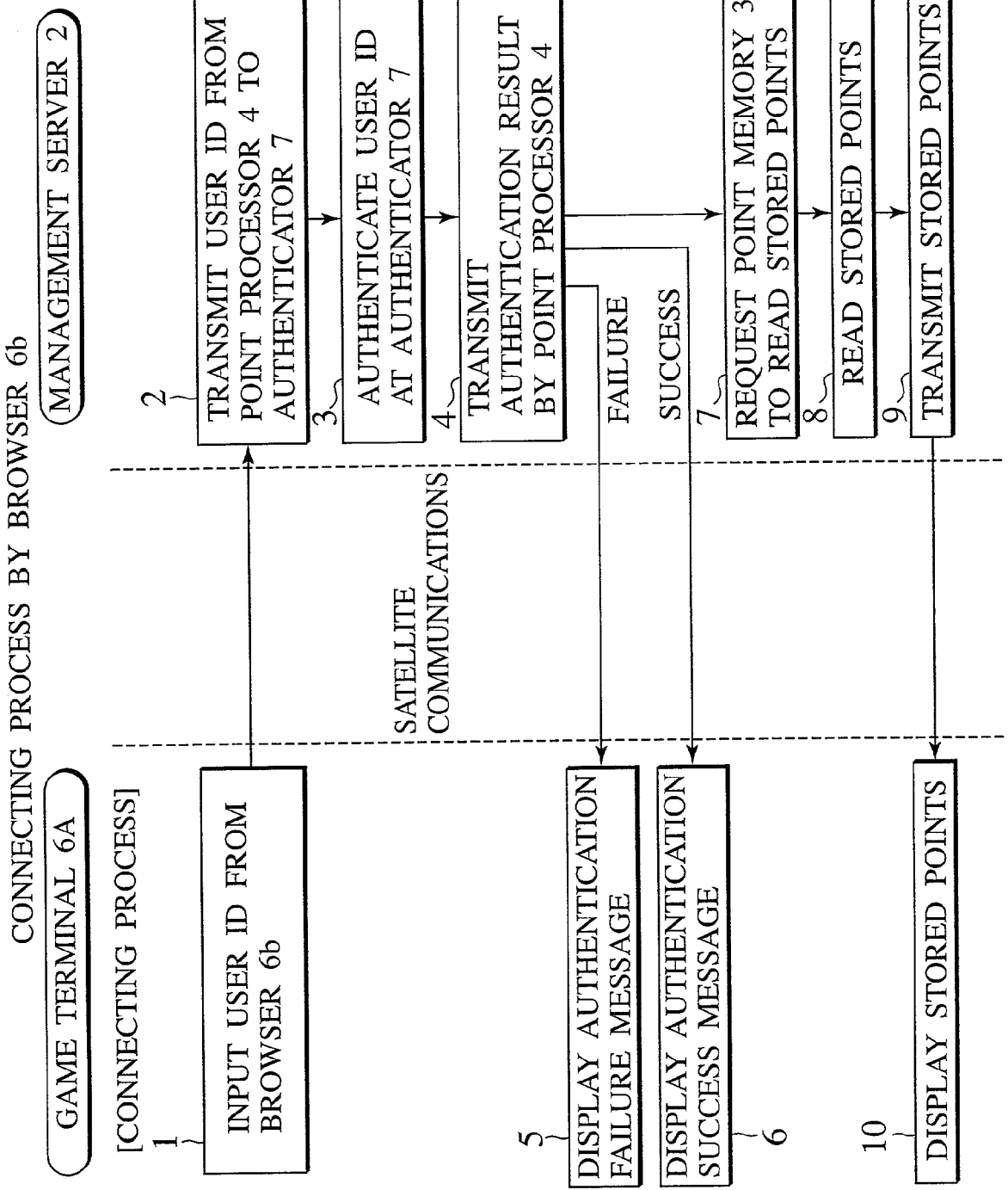

First, referring to FIGS. 4A and 4B, the connection process performed directly between the game terminal 6A and the management server 2 via satellite communications is described.

FIG. 4A illustrates an example where the game terminal 6A uses the function of the game terminal 6A to connect to the management server 2. (1) The user uses a debit card or input terminal equipment to input user ID such as an accounting number or password from the game terminal 6A.

(2) The authenticator 7 in the management server 2 uses the user ID to perform authentication processing for the user. The authentication of the user ID may be performed by verifying the inputted user information (ID) against the user ID stored in the database 7a, for example.

(3) When the user is not authenticated as an authorized user in the authentication processing with the user ID, that is, the user authentication ends in failure, the display device at the game terminal 6A displays a message of "Authentication Failure." (4) When the user is authenticated as an authorized user in the authentication processing with the user ID, that is, the user authentication processing ends in success, the display device of the game terminal 6A displays a message of "Authentication Success."

(5) When the user authentication succeeds, the management server 2 reads the number of points stored in association with the user ID from the database 3a of the point memory 3 for transmission to the game terminal 6A. (6) The display device of the game terminal 6A displays the transmitted number of points.

FIG. 4B illustrates an example of connecting the game terminal 6A having the game terminal equipment 6a2 with a function of establishing connection with the network 13, such as the browser 6b, to the management server 2.

(1) The user uses the browser 6b installed in the game terminal equipment 6a2 to input user ID such as an accounting number or password.

(2) The point processor 4 in the management server 2 transmits the inputted user ID to the authenticator 7. (3) The authenticator 7 performs authentication processing on the user ID. The authentication of the user ID is performed by verifying the inputted user ID against the user ID stored in the database 7a. (4) The point processor 4 receives the result of the authentication by the authenticator 7 and transmits it to the game terminal 6A for the user.

(5) When the result of the user authentication shows that the user is not an authorized user, the display device of the game terminal 6A displays a message of "Authentication Failure." (6) When the result of the user authentication shows that the user is an authorized user, the display device of the game terminal 6A displays a message of "Authentication Success."

(7) Upon the authentication success, the point processor 4 requests read of the stored points to the point memory 3, and (8) reads the stored points from the database 3a of the point memory 3. (9) The point processor 4 transmits the stored points to the game terminal 6A. (10) The display device of the game terminal 6A displays the received stored points.

Figure 5B:
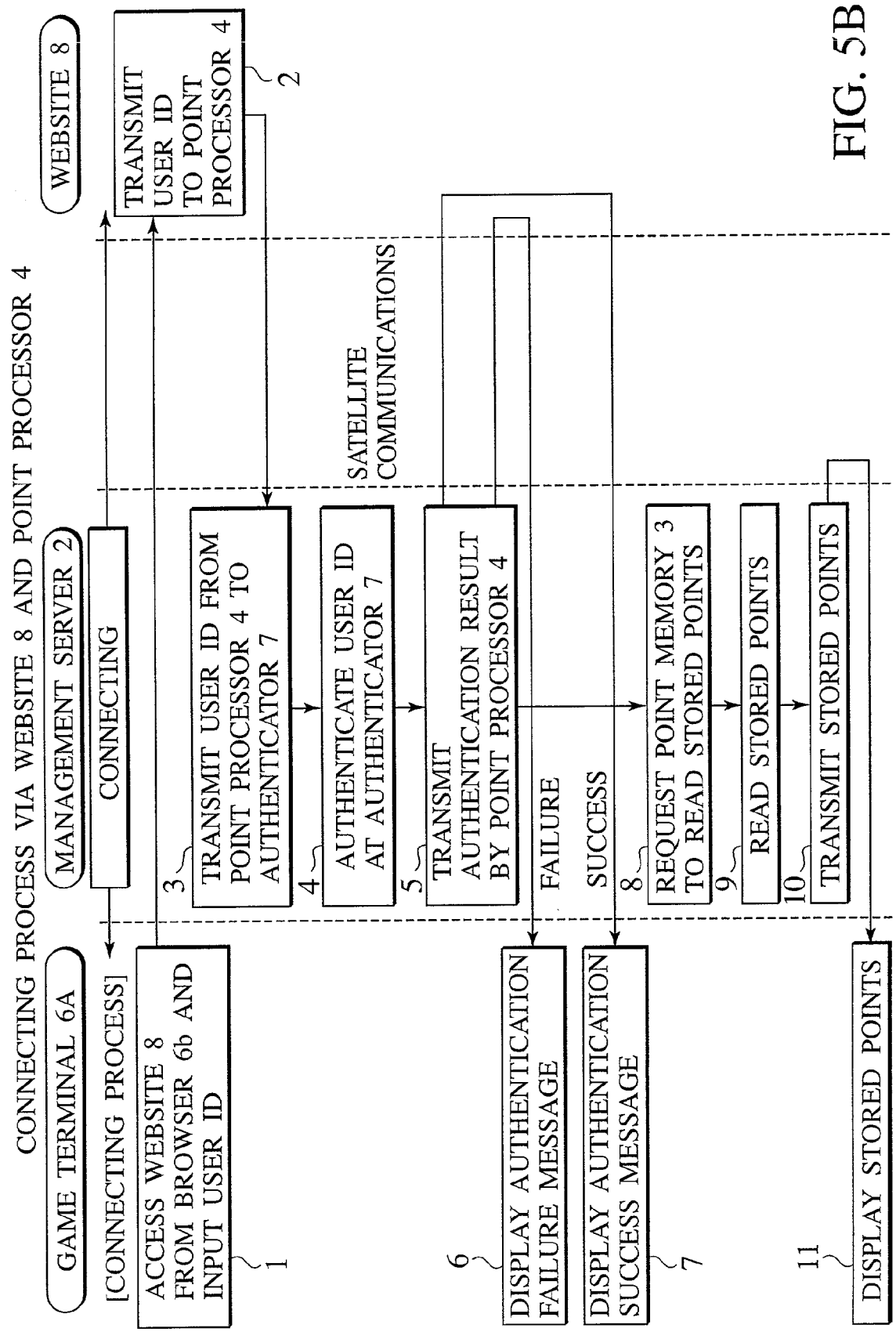

FIGS. 5A and 5B show examples where the game terminal 5A establishes connection with the management server 2 via the website 8. FIG. 5A illustrates an example of establishing connection with the management server 2 from the state where the game terminal 6A is not in connection with the website 8. FIG. 5B illustrates an example of establishing connection with the management server 2 from the state where the game terminal 6A is in connection with the website 8.

In FIG. 5A, (1) the user uses the game terminal equipment 6a2 with a function of establishing connection with the network 13, such as the browser 6b, to establish connection with the website 8 via the satellite communications, and inputs user ID from the browser 6b.

(2) The website 8 transmits the user ID to the authenticator 7 of the management server 2. (3) The authenticator 7 verifies the received user ID against the user ID within the database 7a to perform authentication processing for the user.

(4) When the result of the user authentication shows that the user is not an authorized user, the display device of the game terminal equipment 6a2 displays a message of "Authentication Failure." (5) When the result of the user authentication shows that the user is an authorized user, the display device of the game terminal equipment 6a2 displays a message of "Authentication Success."

(6) Upon authentication success, the point processor 4 reads the stored points from the database 3a of the point memory 3, and (7) transmits the stored points to the display device of the game terminal equipment 6a2. (7) The display device of the game terminal equipment 6a2 displays the stored points.

In some cases, a user utilizes the management server 2 to manage points added in association with the purchase of goods or service performed at the website 8. In these cases, the game terminal 6A performs connecting process via the point processor 4 of the management server 2.

In the case of establishing connection via the website 8 and the point processor 4, as shown in FIG. 5B, (1) the user inputs user ID from the browser 6b, and the game terminal 6A transmits the user ID to the management server 2 in connection. (2) The website 8 transmits the user ID received to the point processor 4 of the management server 2.

(3) The point processor 4 transmits the user ID received to the authenticator 7. (4) The authenticator 7 verifies the received user ID against the user ID within the database 7a to perform authentication processing for the user. (5) The authenticator 7 transmits the result of the authentication to the point processor 4.

When the result of the user authentication shows that the user is not an authorized user, the point processor 4 transmits a message of "Authentication Failures" via the website 8 to the game terminal 6A. (6) The display device of the game terminal equipment 6a2 displays a message of "Authentication Failure." When the result of the user authentication shows that the user is an authorized user, the point processor 4 transmits a message of "Authentication Success" via the website 8 to the game terminal 6A. (7) The display device of the game terminal equipment 6a2 displays the message of "Authentication Success."

(8) Upon authentication success, the point processor 4 requests read of the stored points from the database 3a of the point memory 3, and (9) reads the stored points.

(10) The point processor 4 transmits the stored points to the game terminal 6A. (11) The display device of the game terminal equipment 6a2 displays the stored points.

Figure 6:
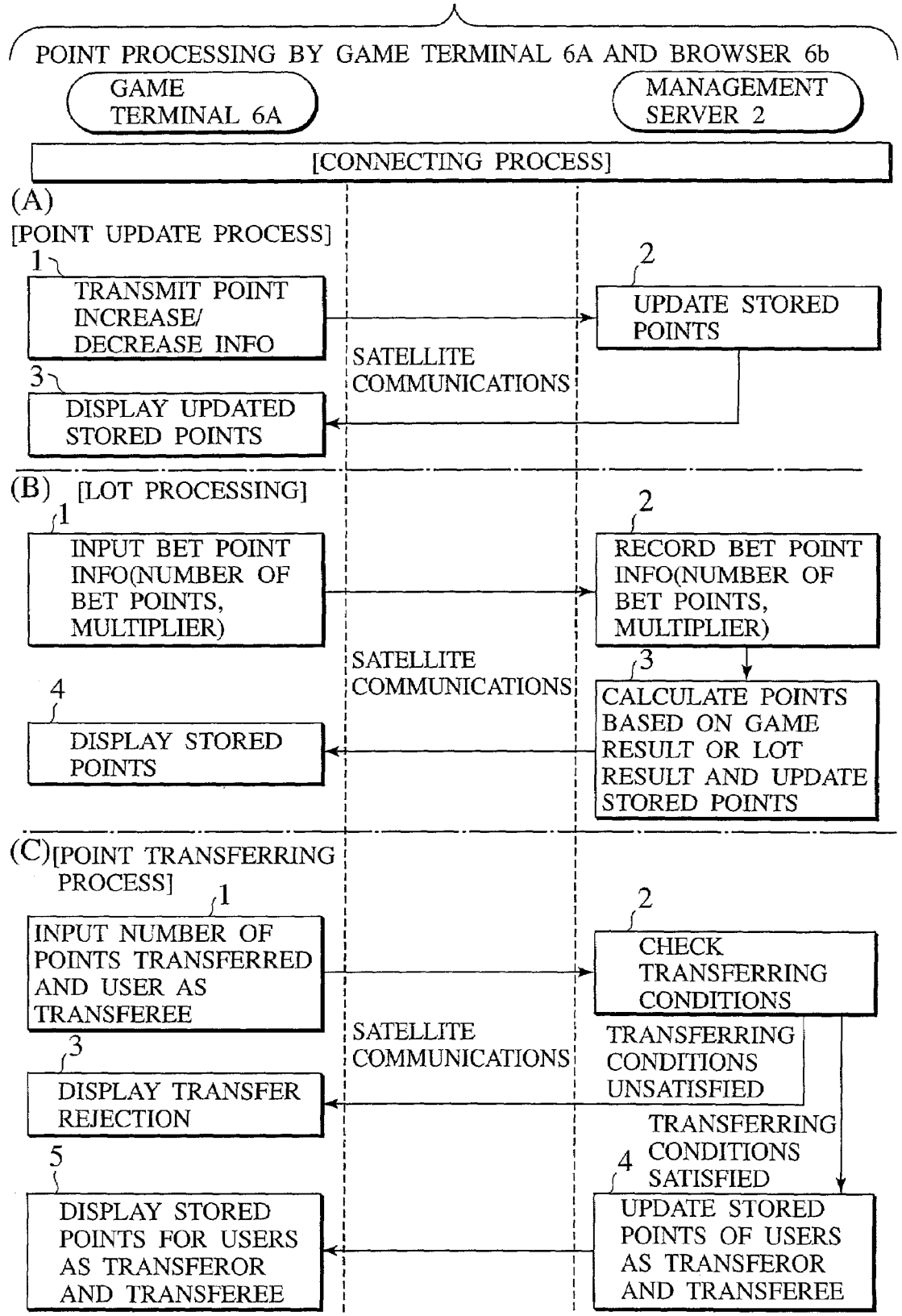
FIGS. 6(A) to 6(C) are sequence diagrams illustrating point processing in the point management system according to the first embodiment of the present invention.
Figure 7:
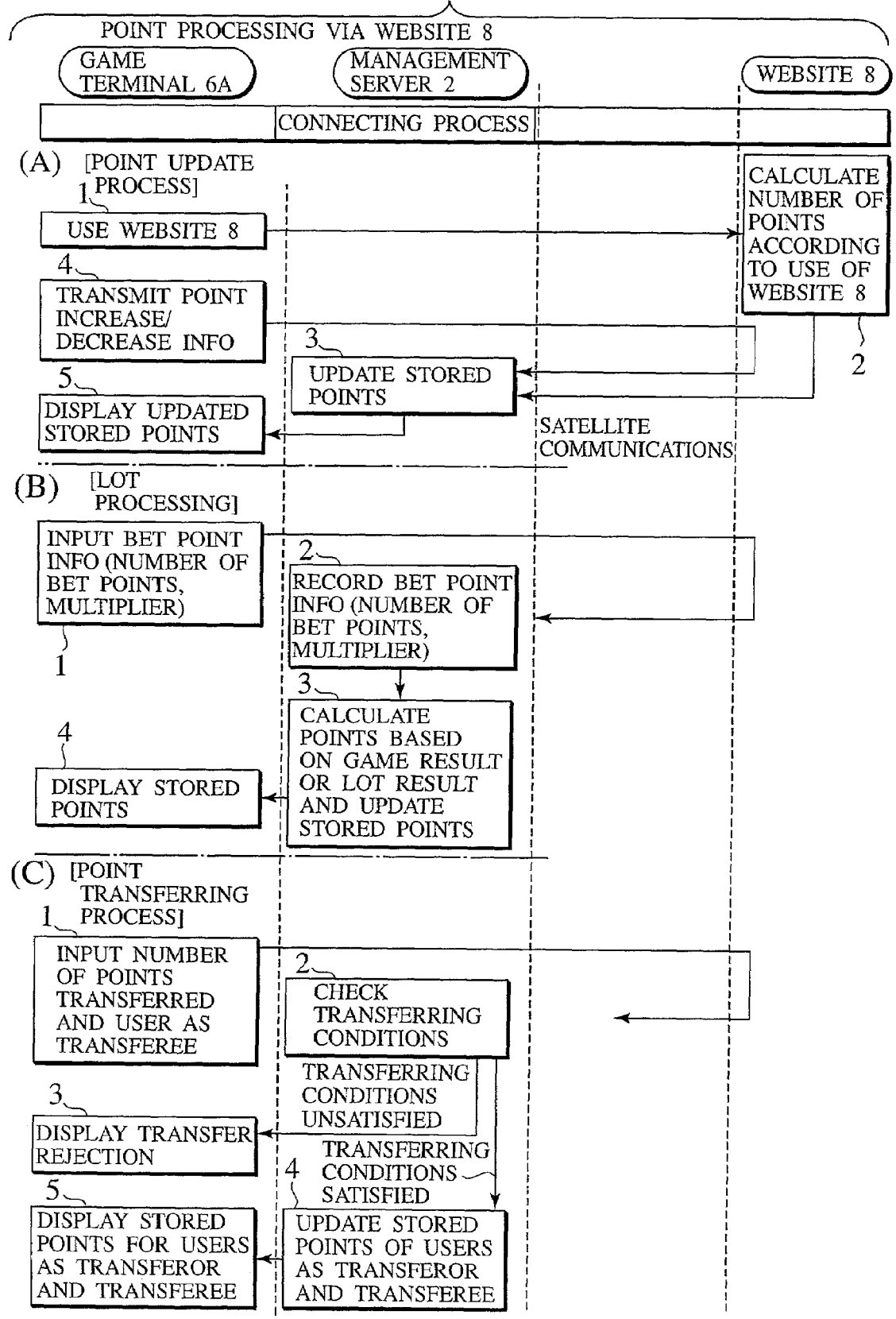
FIGS. 7(A) to 7(C) are sequence diagrams illustrating point processing in the point management system according to the first embodiment of the present invention.
Figure 8:
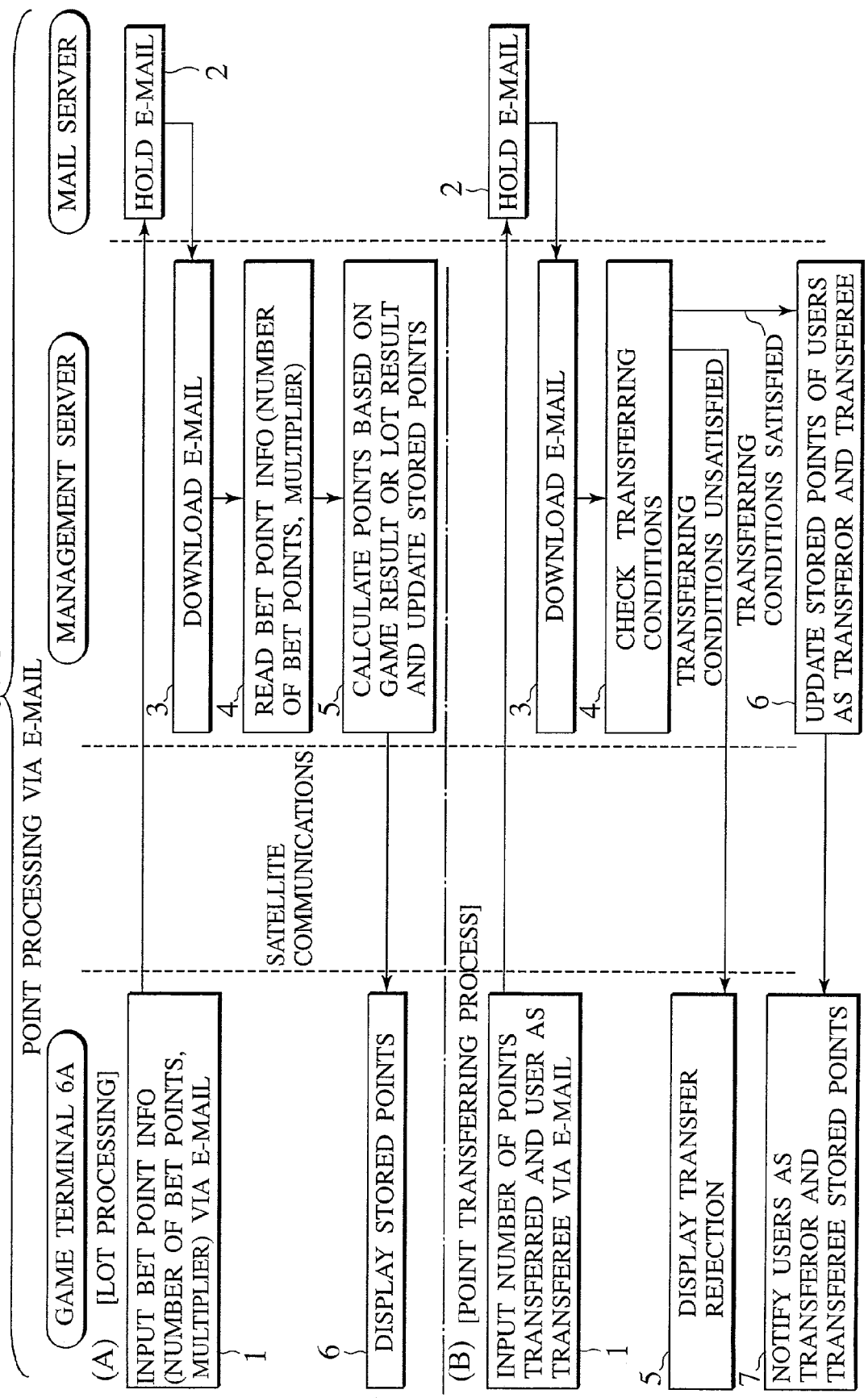
FIGS. 8(A) and 8(B) are sequence diagrams illustrating point processing in the point management system according to the first embodiment of the present invention.

Next, with reference to FIGS. 6 and 7, point processing after the completion of the connecting process will be described.

In the following description of the point processing, the point processing by the game terminal 6A or the browser 6b is described with reference to FIGS. 6(A) to 6(C), and the point processing via the website 8 is described with reference to FIGS. 7(A) to 7(C).

Here, as the "point processing," a point update process associated with the purchase of goods or service (hereinafter referred to as a "point update process"), a point update process based on a result of lot (hereinafter referred to as "lot processing"), and a point update process caused by the transfer of points (hereinafter referred to as a "point transferring process") will be described, respectively.

FIG. 6(A) is a sequence diagram illustrating a point update process. (1) A user or a service provider uses the browser 6b installed in the game terminal 6A or the game terminal equipment 6a2 to transmit point increase/decrease information to the management server 2 via satellite communications. (1) The point increase/decrease information includes either increase or decrease and the associated number of points.

(2) The point memory 3 of the management server 2 updates the stored points within the database 3a based on the point increase/decrease information received. The management server 2 transmits the updated stored points to the game terminal 6A or the game terminal equipment 6a2 of the user. (3) The display device of the game terminal 6A or the game terminal equipment 6a2 displays the stored points received.

The point update process of FIG. 6(A) can be used to update the stored points for the purchase of goods or service performed in the vehicle 6, or to update the stored points based on the number of points given in accordance with delay time when the vehicle 6 is overdue.

FIG. 6(B) is a sequence diagram illustrating a point update process based on a result of a game executed or a result of lot, that is, lot processing.

(1) A user uses the browser 6b installed in the game terminal 6A or the game terminal equipment 6a2 to transmit "bet point information" necessary for the determination of the number of points to be increased or decreased in accordance with a result of the execution of a game or a result of lot, to the point processor 4 of the management server 2 via satellite communications. The "bet point information" includes the number of bet points and a multiplier.

(2) The point processor 4 of the management server 2 records the bet point information, and (3) calculates acquisition points or loss points based on the game execution result or the lot result to update the stored points.

(4) The display device of the game terminal 6A or the game terminal equipment 6a2 of the user displays the game execution result or the lot result and the updated stored points.

FIG. 6(C) is a sequence diagram illustrating a point update process for the transfer of points, that is, point transferring process.

(1) The user uses the browser 6b installed in the game terminal 6A or the game terminal equipment 6a2 to transmit point information including the number of points to be transferred and a user as a transferee, to the point memory 3 of the management server 2, via satellite communications.

(2) The point memory 3 of the management server 2 checks transferring conditions. The transferring conditions are such as whether the number of points to be transferred is below the stored points, and whether the user as the transferee is registered in the point memory 3.

When the transferring conditions are not satisfied, the point memory 3 notifies the game terminal 6A that the points cannot be transferred to the user as the transferee. (3) The game terminal 6A displays the notification.

When the transferring conditions are satisfied, (4) the point memory 3 subtracts the number of points to be transferred from the stored points of the user as the transferor for update, and adds the number of points to be transferred to the stored points of the user as the transferee for update. The management sever 2 transmits the respective stored points to the game terminals 6A of the users as the transferor and the transferee. The game terminals 6A of the users as the transferor and the transferee display the respective stored points.

Through the point transferring process as shown in FIG. 6C, users can transfer points to one another in the vehicles 6, for example, so that the users execute games using the transferred points when they have a small number of stored points.

Next, point processing via the website 8 is described with reference to FIGS. 7(A) to 7(C). FIG. 7(A) is a sequence diagram illustrating a point update process associated with the purchase of goods or service.

(1) A user in the vehicle 6 utilizes satellite communications and the website 8 to purchase goods or service. (2) The website 8 calculates the number of points in accordance with the purchasing of goods or service to update the stored points within the database 3a of the point memory 3 in the management server 2.

(4) When the user transmits point increase/decrease information to the management server 2, (3) the stored points within the database 3a of the point memory 3 in the management server 2 are updated. The management server 2 transmits the updated stored points to the game terminal 6A of the user. (5) The display device of the game terminal 6A displays the stored points.

FIG. 7(B) is a sequence diagram illustrating a point update process based on a result of a game executed or a result of lot, that is, lot processing.

(1) A user uses the browser 6b to transmit bet point information (the number of bet points and a multiplier) necessary for the determination of the number of points to be increased or decreased, to the point processor 4 of the management server 2 via satellite communications and the website 8. (2) The point processor 4 of the management server 2 records the bet point information, and (3) calculates acquisition points or loss points based on the bet point information and the game execution result or the lot result to update the stored points. (4) The display device of the game terminal equipment 6a2 of the user displays the game execution result or the lot result and the updated stored points.

FIG. 7(C) is a sequence diagram illustrating a point update process for the transfer of points between users, that is, point transferring process.

(1) A user uses the browser 6b to transmit point information including the number of points to be transferred and a user as a transferee, to the point memory 3 of the management server 2 via satellite communications and the website 8.

(2) The point memory 3 of the management server 2 checks transferring conditions on the number of points to be transferred and the user as the transferee. When the transferring conditions are not satisfied, the point memory 3 notifies the game terminal 6A of the user as the transferor that the points cannot be transferred. (3) The game terminal 6A displays the notification.

When the transferring conditions are satisfied, (4) the point memory 3 subtracts the number of points to be transferred from the stored points of the user as the transferor for update, and adds the number of points to be transferred to the stored points of the user as the transferee for update. The management server 2 transmits the respective stored points to the game terminals 6A of the users as the transferor and the transferee. (5) The game terminals 6A of the users as the transferor and the transferee display the respective stored points.

The point management system according to the present embodiment enables point processing using E-mail as well as the above-described point processing.

FIGS. 8(A) and 8(B) illustrate examples of point processing using E-mail. When point processing is performed with E-mail, the game terminal 6A transmits point information in the form of E-mail to the mail server 9 in the network 13 or a mail server provided within the management server 2. The management server 2 reads the E-mail to perform point processing.

FIG. 8(A) is a sequence diagram illustrating lot processing.

(1) A user transmits bet point information (the number of bet points and a multiplier) to the mail server 9 in the form of E-mail. (2) The male server 9 holds the E-mail.

(3) The point processor 4 of the management server 2 downloads the E-mail from the mail server 9 and (4) reads the bet point information. (5) The point processor 4 calculates acquisition points and loss points based on the bet point information and a result of the execution of a game or a result of lot, and updates the stored points. (6) The display device of the game terminal equipment 6a2 displays the game execution result or the lot result and the updated stored points.

FIG. 8(B) is a sequence diagram illustrating a point transferring process.

(1) The user transmits point information including the number of points to be transferred and a user as a transferee, to the mail server 9, in the form of E-mail. (2) The mail server 9 holds the E-mail. (3) The point processor 4 of the management server 2 downloads the E-mail from the mail server 9.

(4) The point memory 3 of the management server 2 checks transferring conditions on the number of points to be transferred and the user as the transferee. When the transferring conditions are not satisfied, the point memory 3 notifies the game terminal 6A of the user as the transferor that the points cannot be transferred. (5) The game terminal 6A displays the notification.

When the transferring conditions are satisfied, (6) the point memory 3 subtracts the number of points to be transferred from the stored points of the user as the transferor for update, and adds the number of points to be transferred to the stored points of the user as the transferee. The management server 2 notifies the respective stored points to the users as the transferor and the transferee. (7) The game terminals 6A of the users as the transferor and the transferee display the respective stored points.

Figure 9:
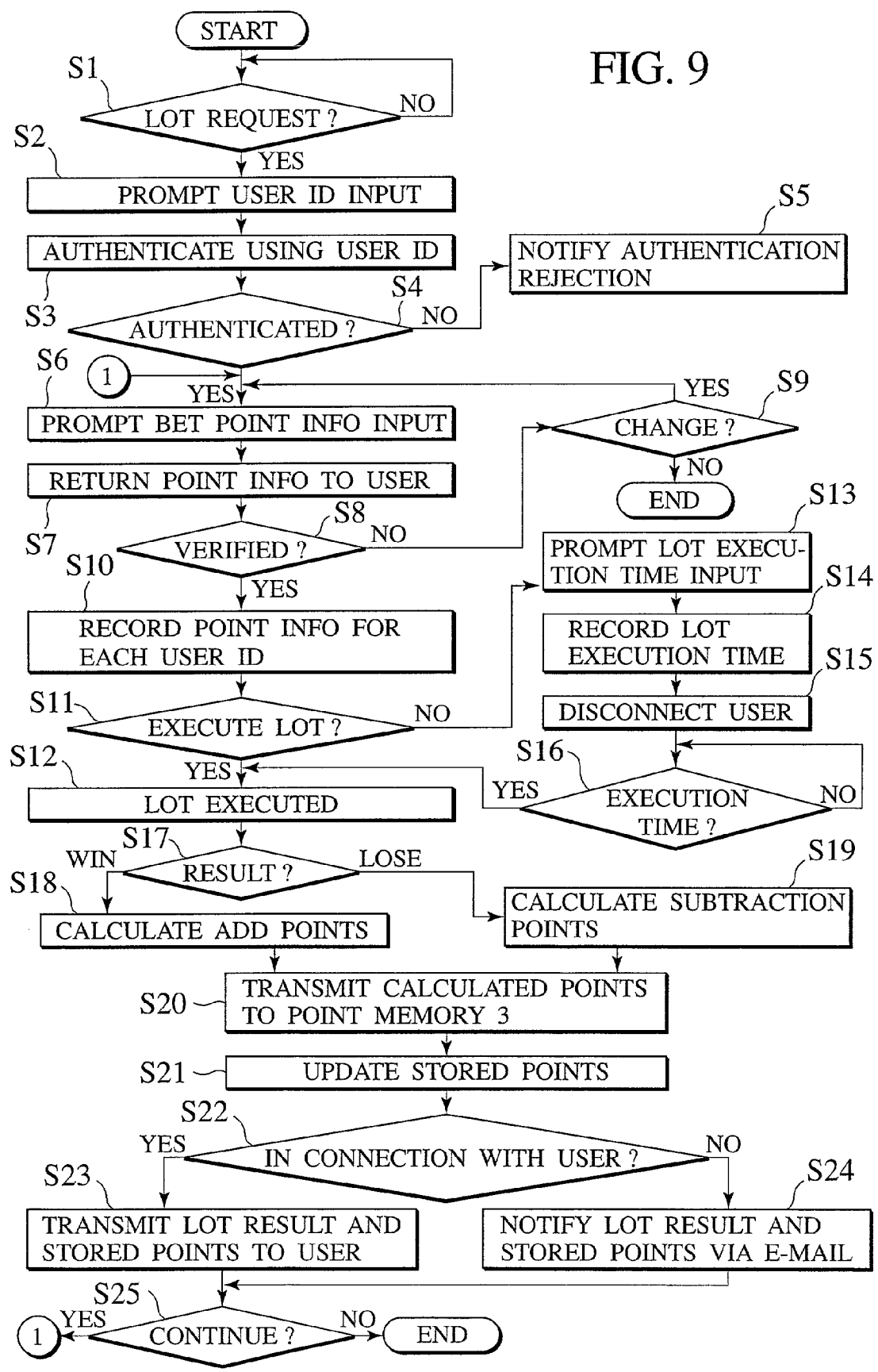
FIG. 9 is a flow chart illustrating the point processing in the point management system according to the first embodiment of the present invention.

Next, an example of "lot processing" performed by the point processor 4 is described with reference to the flowchart in FIG. 9 and the data contents in FIGS. 10A and 10B. Here, the description is made for the point update process performed in accordance with a result of lot.

Receiving a "lot request (request for a point update process based on a result of game execution or a result of lot)" from a user (at S1), the point processor prompts the user to input user ID (at S2).

The point processor 4 transmits the user ID to the authenticator 7, and the authenticator 7 performs user identification processing (at S3). When the result of the authentication processing (at S4) shows that the user is not an authorized user, the failure of authentication is notified to the user (at S5). When the result of the authentication processing (at S4) shows that the user is an authorized user, the user is prompted to input bet point information including the number of bet points and a multiplier (at S6). The multiplier may be set for each user based on the user's request or may be set uniform for every user.

When receiving the bet point information from the user, the point processor 4 returns the bet point information to the user (at S7), to obtain the verification by the user (at S8).

The result of the user's verification shows that the bet point information should be changed (at S9), the above steps S6, S7 and S8 are repeated. After obtaining the verification by the user (at S9), the point processor 4 records the bet point information for the user (at S10).

At the instant of obtaining the bet point information by the user, the point processor 4 inquires the user whether to execute lot immediately or not (at S11). When the answer is Yes, the lot is executed (at S12).

When the answer is No (at S11), the point processor 4 prompts the user to input the time to execute the lot (at S13), records the lot execution time received (at S14), and disconnects the user (at S15). Thereafter, the point processor 4 executes the lot at the recorded execution time (at S16).

From the result of the lot execution, it is determined whether the user "wins" or "loses" the lot. When the user "wins," the point processor 4 calculates the number of add points based on the number of bet points and the multiplier (at S18). When the user "loses," the point processor 4 calculates the number of subtraction points based on the number of bet points and the multiplier (at S19). When increasing or decreasing points based on a result of game execution, the point processor 4 calculates the number of add points or the number of subtraction points based on the number of bet points, a multiplier, and a result of the game executed.

The point processor 4 transmits the calculated increased or decreased number of points to the point memory 3 (at S20). The point memory 3 updates the stored points in accordance with the increased or decreased number of points for the user (at S21).

When being in connection with the user (at S22), the point processor 4 transmits the lot result (or game execution result), the increased or decreased number of points, and the stored points to the user for display (at S23). When disconnecting from the user (at S23), the point processor 4 notifies the user of the lot result (or game execution result), the increased or decreased number of points, and the stored points via E-mail (at S24). Thereafter, when the lot (game) is continued, the point processor 4 returns to the step S6 to repeat the process (at S25).

FIGS. 10A and 10B illustrate an example of data contents for use in the point processing by the point processor 4.

FIG. 10A illustrates an example of memory contents within the database 4a for use in the "lot processing" performed based on a result of lot. FIG. 10B illustrates an example of memory contents within the database 4a for use in the "lot processing" performed based on a result of a game executed.

The database 4a shown in FIG. 10A stores "user ID," "the number of bet points," "multipliers," "lot execution time," "reception time," "lot results" and "the number of increased or decreased points," which items are associated with one another.

The database 4a shown in FIG. 10B stores "user ID," "the number of bet points," "multipliers," "game execution results" and "the number of increased or decreased points," which items are associated with one another. In the latter case, the "multipliers" may be changed based on game execution results ("Result a" and "Result b").

Next, an example of point management processing performed by the point memory 3 is described with reference to the flowchart in FIG. 11 and exemplary data contents shown in FIG. 12. FIGS. 11 and 12 illustrates point processing performed in accordance with a result of lot.

When requested to perform point processing by a user (at S101), the point memory 3 prompts the user to input user ID to perform authentication processing for the user (at S102).

When the user is authenticated as an authorized user, the point memory 3 reads the stored points of the user (at S103). The point memory 3 determines the character of the request (at S104).

When the request is for a point update process (at S104), the point memory 3 prompts the user to input data to be changed (at S105), reads the stored points from the database 3a (at S106), calculates new stored points using the change data and the stored points (at S107), and updates the stored points using the calculated points (at S108). The updated points are notified to the user (at S109).

When the request is for a point transferring process (at S104), the point memory 3 prompts the user to input the number of points to be transferred and a user as the transferee (at S110) and reads the stored points from the database 3a (at S111).

The point memory 3 checks transferring conditions based on the number of points to be transferred and the user as the transferee, and when the number of points to be transferred is greater than the number of stored points of the user as the transferor (at S112), sends the user a message of "transfer rejected" (at step S113).

When the user as the transferee is not registered in the database 3a of the point memory 3 (at S114), the point memory 3 sends a message of "transferee rejected" to the user (at S115).

When the transferring conditions of the number of points to be transferred and the user as the transferee are satisfied (at S112, S114), the point memory 3 calculates the stored points of the users as the transferor and the transferee based on points to be transferred. The point memory 3 calculates the number of stored points of the user as the transferor by subtracting points to be transferred from the stored points of the user as the transferor, and calculates the number of stored points of the user as the transferee by adding the points to be transferred to the number of stored points of the user as the transferee (at S116). The point memory 3 updates the respective stored points of the users as the transferor and the transferee based on the calculated numbers of stored points (at S117). The point memory 3 notifies the users of the respective updated stored points (at S118).

When the request is for "lot processing" (at S104), the point memory 3 prompts the user to input point information for lot processing (at S119), reads the stored points of the user from the database 3a (at S120), calculates new stored points using the point information and the stored points (at S121), and updates the stored points based on the calculated points (at S122). The point memory 3 notifies the user of the updated stored points (at S123).

FIG. 12 illustrates an example of data contents for use in the point processing by the point memory 3. The database 3a shown in FIG. 12 stores "user ID," "the number of stored points," "the number of acquired points," "the number of transferred points," "users as transferors," "users as transferees," "the number of increased or decreased points" and "processing dates," which items are associated with one another.

Functional Effect of Point Management System in Embodiment 1

In the point management system 1 according to the present embodiment, the management server 2 controls the execution of a game at the game terminal 6A and manages points to be increased or decreased in accordance with a result of the game executed, resulting in reduction of devices to be mounted to the vehicle 6.

In the point management system 1 in this embodiment, any management server 2 connectable to the game terminal 6A via satellite communications can perform the game execution control and the point management.

Point Management System in Embodiment 2

A point management system 1 according to a second embodiment of this invention has a management server 2 controlling game execution at a game terminal 6A in a vehicle 6 and managing points to be increased or decreased based on a result of the game execution via satellite communications.

In the point management system 1 of this embodiment, the vehicle 6 has, as shown in FIG. 1B, the game terminal 6A and a game controller 5. The management server 2 has a point memory 3, a point processor 4, and an authenticator 7. The game terminal 6A is connected to the game controller 5 for communication. The game terminal 6A is configured to be able to communicate with the management server 2 via satellite communications.

Figure 13:
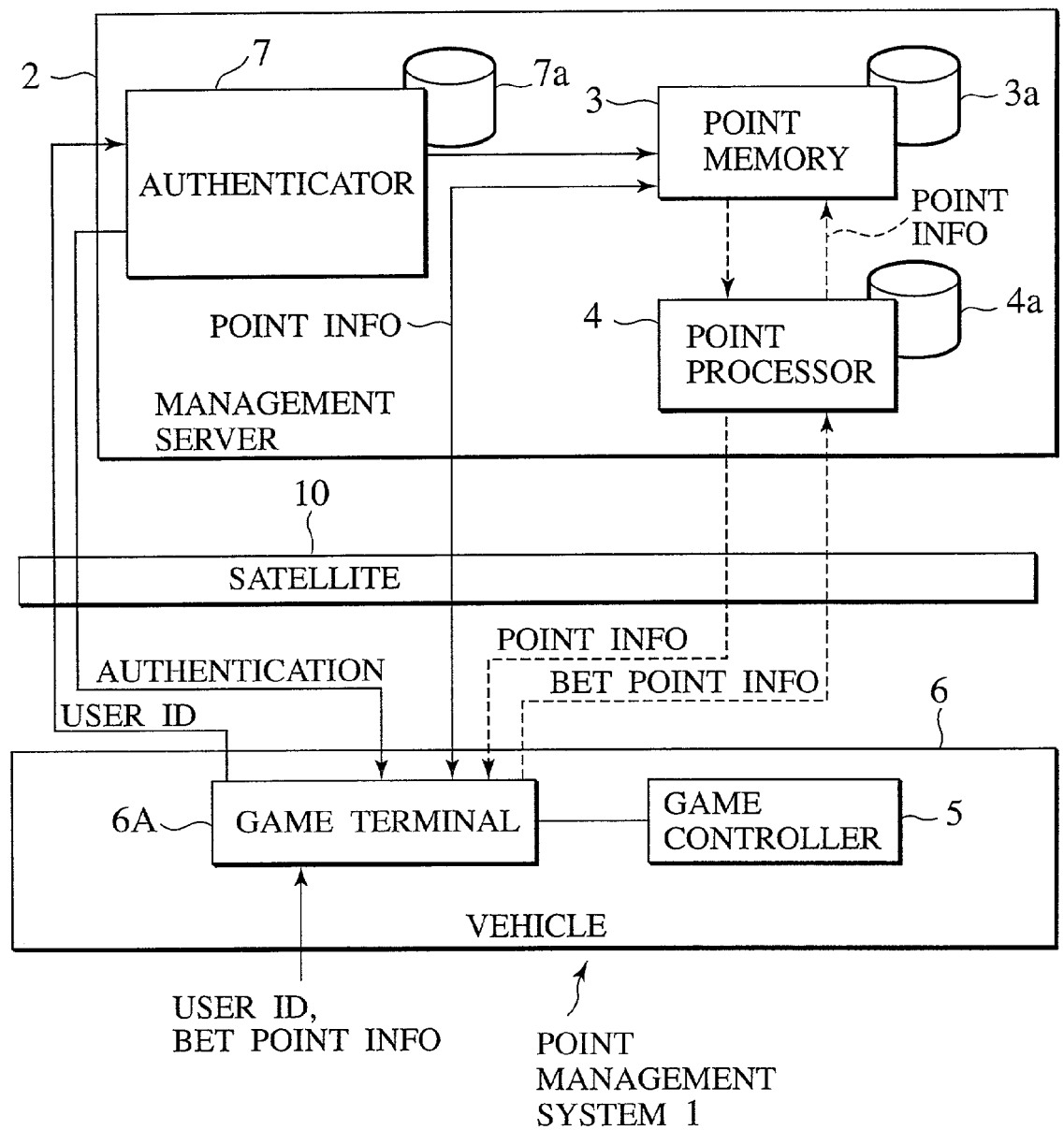
FIG. 13 is a functional block diagram of a point management system according to a second embodiment of the present invention.

Next, with reference to FIG. 13, an exemplary operation of the point management system 1 of this embodiment is described.

In FIG. 13, the management server 2 has the point memory 3, the point processor 4, and the authenticator 7, and manages stored points of a user based on point information from the game terminal 6A.

The authenticator 7 determines whether a user accessing the management server 2 is a registered authorized user or not, and allows only an authorized user to access the management sever 2 to enable transmission of a request for point information update to the point memory 3 and various requests to the point processor 4.

The point processor 4 determines the number of increased or decreased points for changing the number of points possessed by a user based on a request from the user. The point memory 3 updates the stored points of the user based on the number of increased or decreased points.

The processing of increasing and decreasing the number of points by the point processor 4 includes various processing, such as the processing of determining the number of points to be increased or decreased based on a result of lot or a game (lot processing) and the processing of transferring points from a user to another user (a point transfer process).

That is, the point processor 4 may increase or decrease the number of points stored in the point memory 3 by the number of points (the number of bet points) having been inputted via the game terminal 6A in accordance with a result of game execution (or a result of lot).

The point processor 4 may also update the number of points stored in the point memory 3 in accordance with the traveling conditions of the vehicle 6.

The vehicle 6 has the game controller 5 for controlling the game terminal 6A and the game operation of the game terminal 6A. The game terminal 6A mounted to the vehicle 6 connects to a satellite base station 11 and an exchange 12 via a satellite 10, and then connects the management server 2 directly or via a network 13 to transmit a request for access to the stored points of a user and various requests to the point processor 4. A result of a game executed at the game terminal 6A is transmitted to the point processor 4 with bet point information for the calculation of the number of acquired points. Point information including the calculated number of points is managed by the point memory 3.

The point management system 1 according to the present embodiment has the game controller 5 mounted to the vehicle 6, so that the operator of the vehicle 6 can provide a game created on the spot, or the traveling position of the vehicle can be incorporated into the content of a game, resulting in the construction of an original game related to the vehicle 6.

Point Management System in Embodiment 3

A point management system 1 according to a third embodiment has a management server 2 controlling the execution of a game at a game terminal 6A mounted to a vehicle 6 via satellite communications, and a point record medium 20 recording points obtained in accordance with a result of game execution in the vehicle 6.

In FIG. 1C, the point record medium 20 is a medium for rewritably recording points, and is realized by a ticket such as a boarding ticket for an airplane or ship or a railway ticket, for utilizing the vehicle 6, for example. The vehicle 6 is provided with a point processor 4 which can rewrite points on the point record medium 20, together with the game terminal 6A. The game terminal 6A communicates with the management server 2 via satellite communications.

The management server 2 has a game controller 5 for controlling game operation and a point memory 3.

The connection between the game terminal 6A mounted to the vehicle 6 and the management server 2 is established in a similar manner to that in the first embodiment.

The management server 2 connects to the game terminal 6A in the vehicle 6 via a satellite 10, a satellite base station 11, and an exchange 12, and controls the execution of a game at the game terminal 6A by the game controller 5.

The point processor 4 mounted to the vehicle 6 calculates the number of increased or decreased points based on information from the game terminal 6A, and updates the recorded content (stored points) of the point record medium 20 connected to the game terminal 6A based on the calculated increased or decreased points.

Points recorded on the point record medium 20 after a user possessing the point record medium 20 gets down the vehicle 6 are read by a given point record medium reader. The point memory 3 stores the points read by the given point record medium reader.

The point memory 3 may be provided within the management server 2 or may be provided within a management device in a company providing the operation service of the vehicle 6.

Figure 14:
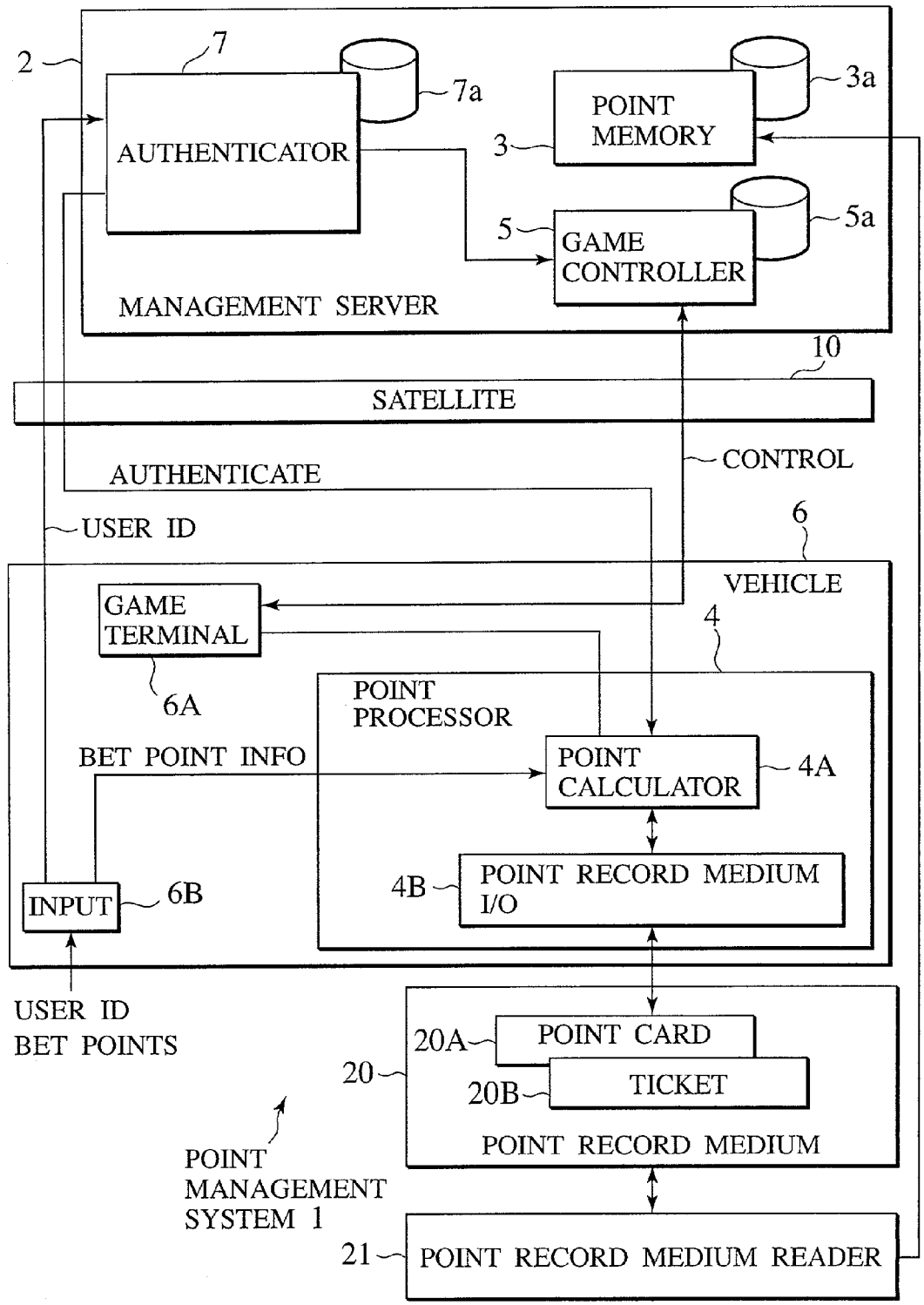
FIG. 14 is a functional block diagram of a point management system according to a third embodiment of the present invention.

With reference to FIG. 14, a detailed construction of the point management system of this embodiment is described.

In FIG. 14, the management server 2 has the point memory 3, the game controller 5, and an authenticator 7, and manages the stored points of a user based on point information from the game terminal 6A.

The authenticator 7 determines whether a user accessing the management server 2 is an authorized user or not, and allows only an authorized user to access the management sever 2 to enable transmission of a request for point processing to the point memory 3 and various requests to the point processor 4. When the game terminal 6A is mounted to the vehicle 6 and has been registered, the authenticator 7 may authenticate the registration of the game terminal 6A instead of the authentication of the user.

The vehicle 6 has the game terminal 6A, the point processor 4, and an input 6B. The game controller 5 performs game execution control or lot processing for the game terminal 6A connected via the satellite 10.

The point processor 4 has a point calculator 4A for calculating acquired points based on a result of the game execution or a result of lot, and a point record medium I/O 4B for giving and receiving point information to and from the point record medium 20.

The point calculator 4A calculates the number of acquired points with a given multiplier based on bet point information inputted via the input 6B and the game execution result from the game terminal 6A.

When the calculated acquired points is plus, the point calculator 4A adds the number of points to the point record medium 20 via the point record medium I/O 4B, and when the calculated acquired points is minus, subtracts the number of points from the point record medium 20 via the point record medium I/O 4B.

That is, the point calculator 4A increases or decreases the number of points recorded on the point record medium 20 by the number of points having been inputted via the game terminal 6A, in accordance with a result of the game execution or result of lot.

The point calculator 4A may update the number of points recorded on the point record medium 20 in accordance with the traveling conditions of the vehicle 6.

The point record medium 20 may be a point card 20A, a boarding ticket 20B for the vehicle 6 such as an airplane, ship, train, or express train, or a highway ticket. The point card 20A is recorded with the stored points of the user. The boarding ticket 20B is recorded with stored points in accordance with spending. Here, the point card 20A and ticket 20B are used as the point record medium 20 for recording the number of points, and records the number of points acquired in accordance with a game result or a lot result.

A point record medium reader 21 reads the number of points recorded on the point record medium 20. The number of points read by the point record medium reader 21 is stored by the point memory 3. The point memory 3 is not necessarily provided within the management server 2, and may be independent from the management server.

In the point management system 1 of this embodiment, points on the point card 20A possessed by a user or points on the ticket 20B can be used for the execution of a game, and points acquired can be added on the spot to the points on the point card 20A or the ticket 20B.

Thus, in the point management system 1 of this embodiment, a user can use the stored points on the point card 20A in hand or the ticket 20B to easily execute a game, and can have sense of accomplishment through acquiring add points based on a result of the game execution.

Point Management System in Embodiment 4

A point management system 1 according to a fourth embodiment controls the execution of a game at a game terminal 6A on a vehicle 6, and stores points acquired in accordance with a result of game execution on a point record medium 20 on the vehicle 6.

In FIG. 1D, the point record medium 20 is the same as the point record medium 20 in the third embodiment.

The vehicle 6 is provided with the game terminal 6A, a game controller 5 for controlling the execution of a game, and a point processor 4 for calculating increased or decreased points based on a result of a game executed at the game terminal 6A. Rewiring of stored points on the point record medium 20 is performed on the vehicle 6.

On the vehicle 6, the game controller 5 controls the execution of a game at the game terminal 6A, the point processor 4 calculates the number of points to be increased or decreased for the game terminal 6A, and the calculated number of points is recorded on the point record medium 20. After a user possessing the point record medium 20 gets down the vehicle 6, the number of points recorded on the point record medium 20 is read by a given reader and affects the stored points in a point memory 3. The point memory 3 may be provided within the management server 2, or may be provided within a management device in a company providing operation service of the vehicle 6.

Figure 15:
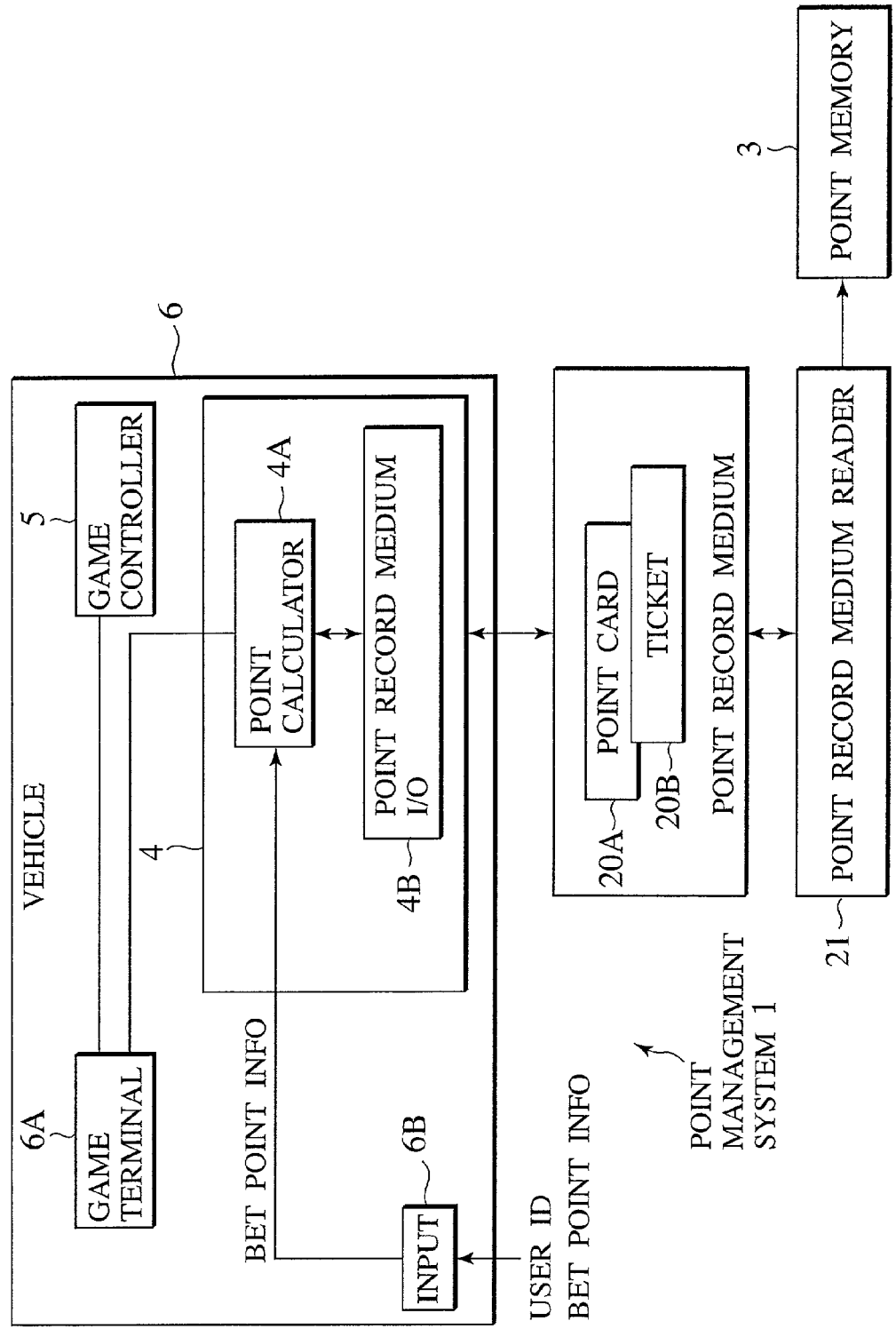
FIG. 15 is a functional block diagram of a point management system according to a fourth embodiment of the present invention.

With reference to FIG. 15, a construction of the point management system 1 of this embodiment will be described in detail.

In FIG. 15, the vehicle 6 has the game terminal 6A, the game controller 5, the point processor 4, and an input 6B. The game terminal 6A is identical to the game terminal 6A in the third embodiment except that it is controlled by the game controller 5 mounted to the vehicle 6.

The point processor 4 has a point calculator 4A and a point record medium I/O 4B. The point calculator 4A calculates the number of acquisition points with a given multiplier based on bet point information inputted from the input 6B and a result of game execution (or a result of lot) from the game terminal 6A, and updates stored points recorded on the point record medium 20 based on the acquired points via the point record medium I/O 4B.

The point processor 4 may update the number of points recorded on the point record medium 20 in accordance with the traveling conditions of the vehicle 6.

The point record medium 20 may, as in the third embodiment, use a point card 20A or a boarding ticket 20B for the vehicle 6. The number of points recorded on the point record medium 20 is read by a point medium reader 21, and stored by the point memory 3.

Figure 16:
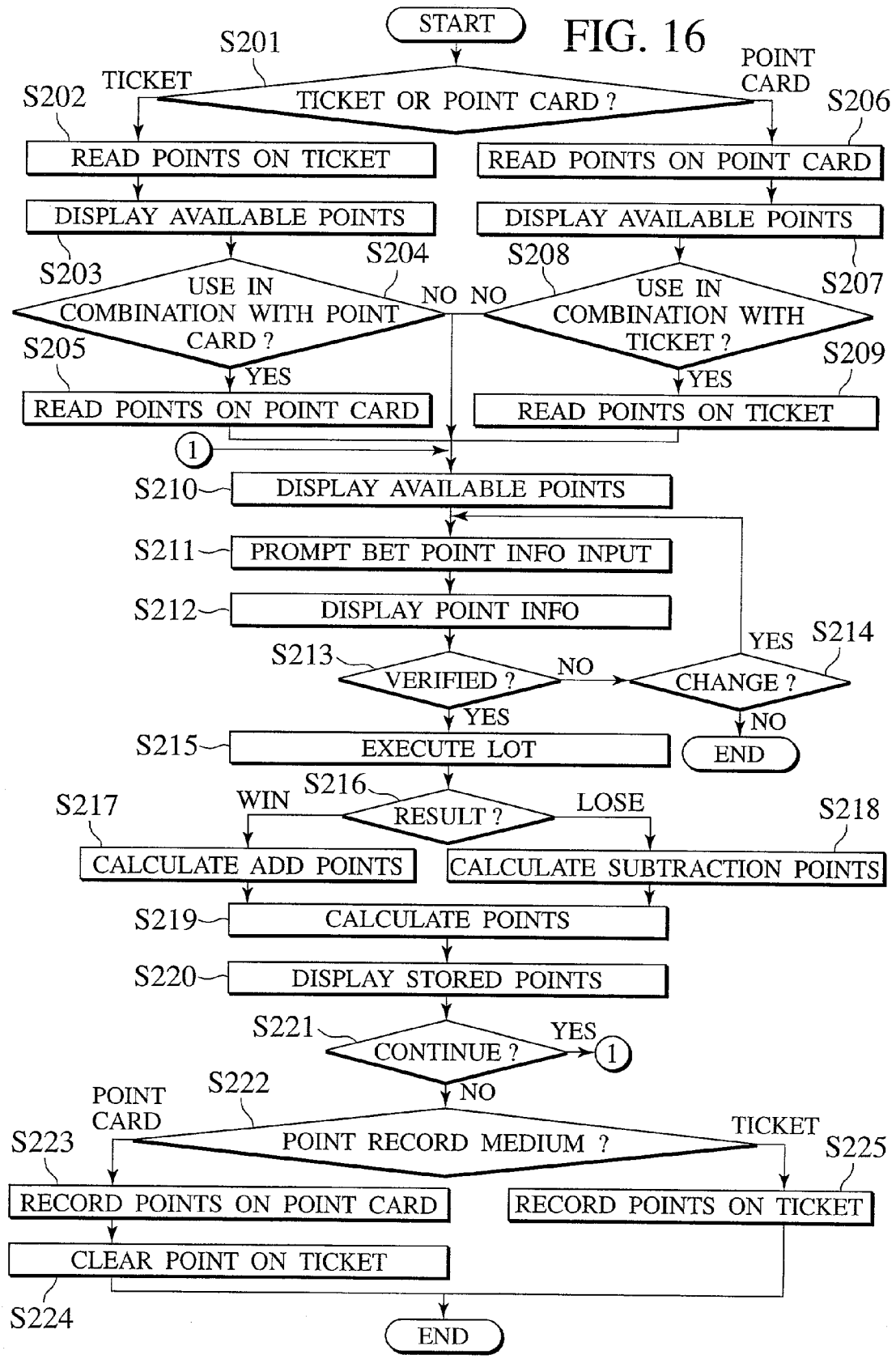
FIG. 16 is a flow chart illustrating point processing in the point management system according to the fourth embodiment of the present invention.

With reference to the flow charts in FIGS. 16 and 17, the exemplary operation of the point processor 4 in the point management system 1 of this embodiment will be described. The flowchart in FIG. 16 illustrates lot processing performed by the point processor 4.

The point processor 4 determines whether the point record medium 20 connected to the point record medium I/O 4B is the point card 20A or the ticket 20B (at S201). When the point record medium 20 is the ticket 20B, the point record medium I/O 4B reads the number of points recorded on the ticket 20b (at S202), and prompts the game terminal 6A to display it as the number of points available for the execution of a game (lot) (at S203).

When points stored on the point card 20A are used in combination (at S204), the point record medium I/O 4B reads the points stored on the point card 20A (at S205), and prompts the game terminal 6A to display it as the number of points available for the execution of a game (lot) (at S210).

When the point record medium 20 is the point card 20A, the point record medium I/O 4B reads the number of points recorded on the point card 20A (at S206), and prompts the game terminal 6A to display it as the number of points available for the execution of a game (lot) (at S207). When points on the ticket 20B are used in combination (at S208), the point record medium I/O 4B reads the points recorded on the ticket 20B (at S209), and prompts the game terminal 6A to display it as the number of points available for the execution of a game (lot) (at S210).

The input 6B prompts the user to input bet point information (such as the number of bet points and a multiplier) for use in the execution of a game (lot) (at S211) to display it at the game terminal 6A (at S212).

When the user checks the inputted bet point information (at S213) and the bet point information should be changed (at S214), the steps S211, S212 and S213 are repeated. Upon the verification by the user, a game is executed or lot is performed (at S215).

The point calculator 4A calculates add points (at S217) or calculates subtraction points (at S218) in accordance with a result of lot (or a result of game execution), and combines such points with the original points to totalize the number of stored points (at S219) for display at the game terminal 6A (at S220). For continuation (at S221), the steps S210 to S220 are repeated.

For termination (at S221), the user selects the point record medium 20 on which to record points (at S222). When the points are recorded on the point card 20A, the point calculator 4A records the points on the point card 20A connected to the point medium I/O 4B (at S223), and clears the points on the ticket 20B (at S224). When the points are recorded on the ticket 20B, the point calculator 4A records the points on the ticket 20B (at S225).

The points recorded on the point record medium 20 are processed as shown in the flowchart in FIG. 17.

The point record medium reader 21 reads the user ID and the stored points recorded on the ticket 20B or the point card 20A (at S301), and transmits the user ID and the stored points to the point memory 3 (at S302). The point memory 3 updates the stored points within the database 3a based on the transmitted user ID and the stored points (at S303).

The point management system 1 according to the above-described embodiments has the management server 2 provided in the network 13, and allows access to the management server 2 when authentication using user ID succeeds. Thus point management is transferred from a user to a server, reducing load of point management by a user, thereby eliminating the loss of points.

Further, in the point management system 1 according to the above embodiments, point management for several pieces of point service used by the user is performed by the management server 2 provided in the network 13, which eliminates the need for holding and managing a plurality of point cards.

Further, in the point management system 1 according to the above embodiments, when a debit card recording user ID is used, the storage of points as well as payment is performed with the card.

Further, in the point management system 1 according to the above embodiments, a game (lot) can be executed using fractional points, which enables effective using of fractional points which are conventionally of no use. Users thus can have the opportunity of increasing the stored points, and service providers can show users the availability of points, increasing the effect of points as incentive for the purchase of goods or service.

Further, the point management system 1 according to the above embodiments allows the transfer of points between users through a transferring process by the management server 2, thereby enabling effective use of fractional points which are conventionally of no use.

Further, in the point management system 1 according to the above embodiments, the point record medium 20 may be a boarding ticket 20B for the vehicle 6, so that a user not carrying a card dedicated to point processing (point card 20A) can execute a game (lot) using points.

As described above, the point management system according to the present invention can increase the availability of points for users. Users traveling with vehicles such as airplanes, ships, trains or automobiles can effectively utilize points they have.

What is claimed is:

1. A point management system comprising:
    a game terminal mounted to a vehicle;
    a rewritable point record medium storing information of a number of points for a user;
    a server comprising a point memory for storing user ID and the number of points, which are associated with one another;
    an authenticator for authenticating user ID inputted via said game terminal using said user ID stored in said point memory;
    a game controller for allowing said game terminal to execute a game when said authentication succeeds; and
    a point processor for updating the number of points on the rewritable point record medium and for updating the number of points associated with said user ID stored in said point memory, in accordance with a result of execution of said game;

wherein
    said server comprises said authenticator, said game controller, and said point processor,
    said server and said game terminal are configured to be able to communicate with one another via satellite communications,
    said point processor updates the number of points stored in said point memory in accordance with the traveling conditions of said vehicle, and
    said point processor instructs the point memory to give a predetermined number of points to a user who used the vehicle, when the vehicle traveled with a time delay.

2. A server configured to be able to communicate with a game terminal mounted to a vehicle via satellite communications in which a rewritable point record medium stores information of a number of points for a user, comprising:
    a point memory for storing user ID and the number of points, which are associated with one another;
    an authenticator for authenticating user ID inputted via said game terminal using said user ID stored in said point memory;
    a game controller for allowing said game terminal to execute a game when said authentication succeeds; and
    a point processor for updating the number of points on the rewritable point record medium and for updating the number of points associated with said user ID stored in said point memory, in accordance with a result of execution of said game;

wherein
    said point processor updates the number of points stored in said point memory in accordance with the traveling conditions of said vehicle, and
    said point processor instructs the point memory to give a predetermined number of points to a user who used the vehicle, when the vehicle traveled with a time delay.

* * * * *